US012708115B2

(12) United States Patent
Koehler et al.

(10) Patent No.: US 12,708,115 B2
(45) **Date of Patent: *Aug. 18, 2026**

(54) INGROUND AND ABOVE GROUND TERMITE TRAILING AND RECRUITMENT PRODUCTS AND PROCESSES

(71) Applicant: Florida Insect Control Group LLC, Gainesville, FL (US)

(72) Inventors: Philip G. Koehler, Gainesville, FL (US); Enrico Paolo Levi, Modena (IT)

(73) Assignee: Florida Insect Control Group LLC, Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/189,832

(22) Filed: Apr. 25, 2025

(65) Prior Publication Data

US 2025/0248399 A1 Aug. 7, 2025

Related U.S. Application Data

(63) Continuation-in-part of application No. 18/908,215, filed on Oct. 7, 2024, now Pat. No. 12,302,898, which is a continuation of application No. 18/419,071, filed on Jan. 22, 2024, now Pat. No. 12,137,686, which is a continuation-in-part of application No. 18/367,829, filed on Sep. 13, 2023, now abandoned.

(60) Provisional application No. 63/442,639, filed on Feb. 1, 2023.

(51) Int. Cl.
*A01N 31/14* (2006.01)
*A01P 19/00* (2006.01)

(52) U.S. Cl.
CPC .............. *A01N 31/14* (2013.01); *A01P 19/00* (2021.08)

(58) Field of Classification Search
CPC ................................ A01N 31/14; A01P 19/00
See application file for complete search history.

(56) References Cited

U.S. PATENT DOCUMENTS

| | | | | |
|---|---|---|---|---|
| 5,024,832 | A | 6/1991 | Omata | |
| 5,953,855 | A | 9/1999 | Edwards | |
| 6,233,865 | B1 | 5/2001 | Curtis | |
| 6,266,918 | B1 | 7/2001 | Henderson | |
| 6,352,703 | B1 | 3/2002 | Henderson | |
| 6,370,812 | B1 * | 4/2002 | Burns | A01N 25/006 43/132.1 |
| 6,370,814 | B1 | 4/2002 | Curtis | |
| 6,585,991 | B1 | 7/2003 | Rojas | |
| 7,030,156 | B2 * | 4/2006 | Brode, III | A01N 25/006 549/417 |
| RE40,884 | E | 9/2009 | Masterson | |
| 8,111,155 | B2 | 2/2012 | Barber | |
| 12,137,686 | B1 | 11/2024 | Koehler | |
| 12,302,898 | B2 | 5/2025 | Koehler | |
| 2002/0116866 | A1 | 8/2002 | Aesch | |
| 2004/0068919 | A1 | 4/2004 | Oi | |
| 2005/0196419 | A1 | 9/2005 | Sawyer | |
| 2006/0207164 | A1 | 9/2006 | Pearson | |
| 2013/0340320 | A1 | 12/2013 | Staunton | |
| 2015/0069059 | A1 | 3/2015 | Archer | |
| 2017/0105403 | A1 | 4/2017 | Azzarello | |
| 2022/0151235 | A1 | 5/2022 | Carespodi | |

FOREIGN PATENT DOCUMENTS

| | | | |
|---|---|---|---|
| CN | 104973983 | A | 10/2015 |
| JP | 2008263789 | A | 11/2008 |
| WO | 2007052705 | A1 | 5/2007 |
| WO | 2010127019 | A1 | 11/2010 |
| WO | 2024162995 | A1 | 8/2024 |

OTHER PUBLICATIONS

Cornelius, Mary L. et al., Efficacy of Bait Supplements for Improving the Rate of Discovery of Bait Stations in the Field by Formosan Subterranean Termites (Isoptera: Rhinotermitidae), Household and Structural Insects, Journal of Economic Entomology, 7 pages, Jan. 2009, vol. 102, No. 3., New Orleans, LA, USA.

Botch, Paul S. et al, Effects of Soil Cations on the Foraging Behavior of Reticulitermes flavipes (Isoptera: Rhinotermitidae), Ecology and Behavior, Journal of Economic Entomology, 11 pages, Dec. 10, 2010, vol. 4, No. 2.

Prescott, Luke, Master's Thesis Draft: Soil Tunneling/Tubing by Subterranean Termites in Response to 2-Phenoxyethanol, Department of Entomology and Nematology University of Florida, 25 pages, May 2021.

Soil Infiltration, Soil Health—Guides for Educators, retrieved on Jan. 19, 2024, https://cropwatch.unl. edu/documents/USDA_NRCS_infiltration_guide6-4-14.pdf, 7 pages.

(Continued)

*Primary Examiner* — Sue X Liu
(74) *Attorney, Agent, or Firm* — Steinberger IP Law; Brian S. Steinberger; Hilary F. Steinberger

(57) ABSTRACT

Termite trailing and recruitment compositions, systems, devices, and methods using a trail of a percentage 2 phenoxyethanol (2-PE) dissolved in water to lead subterranean termites to termite bait or monitoring stations with toxicants located about a perimeter of a wood house structures, trees, wood piles, wood pallets, and wood boats. The percentage 2 phenoxyethanol (2-PE) dissolved in water range from approximately 0.1% to approximately 2% depending on soil types. Devices and methods form a complete barrier about wood members so termites are redirected due to elevated soil water concentrations that connect termite toxicants, monitoring stations and/or bait stations with toxicants. Devices and methods form trails of 2-PE dissolved in water direct termites to termite monitoring stations and/or bait stations with toxicants, located on wood-based house structures, trees, boats, cut wood, wood pallets, fences, posts. Trails of 2-PE dissolved in water surrounding termite monitoring stations/bait stations with toxicants can direct termites to the termite toxicants.

21 Claims, 19 Drawing Sheets

(56) References Cited

OTHER PUBLICATIONS

Florida Insect Control Group LLC, PCT Patent Application No. PCT/US24/19121, filed on Mar. 8, 2024, Notification of the Transmittal of the International Search Report and the Written Opinion of the International Searching Authority, or the Declaration, mailed Apr. 16, 2024, 9 pages.
DIY Pest Control, Advanced Termite Bait Station—Outdoor, retrieved from https://termitediypestcontrol.com/collections/termites-control/products/advance-termite-bait-station on Aug. 6, 2024, 7 pages.
TermiteDIY. Obtained from Wayback machine on Oct. 2020, <https://web.archive.org/web/20201020203756/https://termitediypetcontrol.com/products/advance-termite-bait-stqation>. (Year: 2020) 5 pages.
Pest Control Technology. Obtained from <https:www.pctonline.com/article/pct1002_adapting/>, 2010. (Year 2010).
Fei, Huixin, et al. "Increased search tunnel formation by Coptoermes formosanus Shiraki (Isoptera: Rhinotermitidae) in 2-phenoxyethanol treated sand>" Journal of entomological science 40.3 (2005):327-336.(Year:2005) 10 pages.
Pest Solution 365. Obtained from Wayback machine from https://web.archive.org/web/20190523071637/https://pestsolutions365.com/termites-101/full-perimeter-treatment/. 2019. (Year: 2019).
Florida Insect Control Group LLC, PCT Patent Application No. PCT/US2025/026768, filed on Apr. 29, 2025, Notification of the Transmittal of the International Search Report and the Written Opinion of the International Searching Authority, or the Declaration, mailed Jul. 9, 2025, 20 pages.
Biotherm. "Drywood Termite Treatment for Boats in Florida" Biotherm Green Solutions. Web. Nov. 17, 2021; <DOI: https://biothermgreen.com/drywood-termite-treatment-forboats-in-florida/> title, p. 2 first-third paragraphs.
Ben. "The Firewood Dilemma—How to Keep Your Woodpile Termite-Free" Wood Create. Web. Nov. 4, 2023; <DOI: https://wood-create.com/how-to-keep-your-woodpile-termite-free/> Title, p. 1 second paragraph, p. 2 second paragraph.
Florida Insect Control Group LLC, PCT Patent Applicaion No. PCT/US2026/17039, filed on Feb. 27, 2026, Notification of the Transmittal of the International Search Report and the Written Opinion of the International Searching Authority, or the Declaration, mailed Jul. 2, 2026, 18 pages.

* cited by examiner

A1 House or structure

B1 Termite bait stations / termite detection stations

C1 Termite bait matrix or detection device

D1 Termite trailing product applied to soil surface that connects stations

A2 Termite infested wood

B2 Termite tunnel in wood

C2 2-PE + KCl injected into tunnel and absorbed into wood

D2 Termite bait station attached to wood surface

FIG. 5. Diagram of connecting monitoring or bait stations around a house to prevent termites from tunneling between stations.
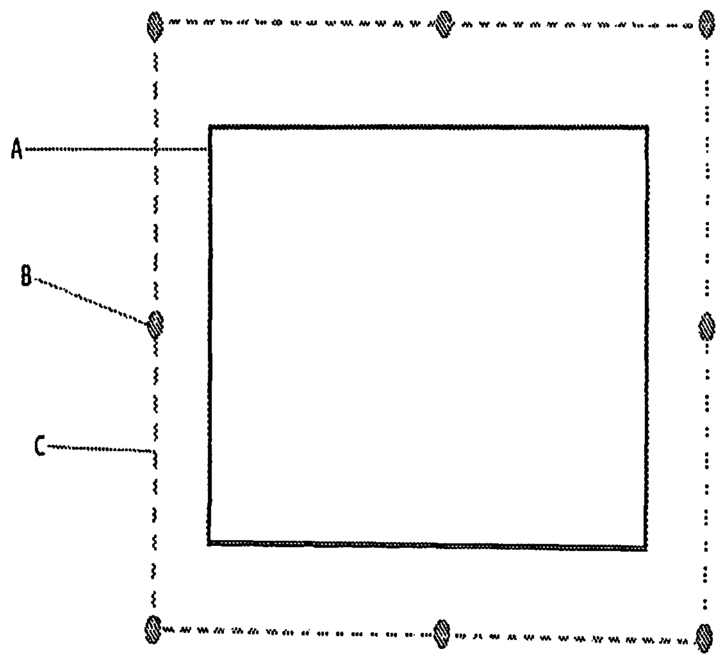
A. House perimeter
B. Termite Monitoring or bait stations
C. Phenoxyethanol trail connecting monitoring or bait stations

INGROUND AND ABOVE GROUND TERMITE TRAILING AND RECRUITMENT PRODUCTS AND PROCESSES

CROSS REFERENCE TO RELATED APPLICATIONS

This application is a Continuation-In-Part of U.S. patent application Ser. No. 18/908,215 filed Oct. 7, 20024, now U.S. Pat. No. 12,302,898, which is a Continuation of U.S. patent application Ser. No. 18/419,071 filed Jan. 22, 2024, now U.S. Pat. No. 12,137,686, which is a Continuation In Part of U.S. patent application Ser. No. 18/367,829 filed Sep. 13, 2023, abandoned, which claims the benefit of priority to U.S. Provisional Application Ser. No. 63/442,639 filed Feb. 1, 2023. The entire disclosure of each of the applications listed in this paragraph are incorporated herein by specific reference thereto.

FIELD OF INVENTION

This invention relates to increasing soil or wood moisture to encourage termites to tunnel and/or trail to termite detectors or a toxicant. Using recruitment compositions, soil or wood treatment compositions, systems, devices, and methods for using 2-phenoxyethanol or 2-phenoxyethanol+potassium salt, dissolved in water. The application of correct concentrations of solutions, dependent on soil types, forms a hygroscopic termite barrier around a wood containing structure and between termite bait and monitoring stations, in order to lead termites to termite toxicants, bait stations and/or monitoring stations.

BACKGROUND AND PRIOR ART 2-phenoxyethanol is a solvent that mimics the trail pheromone of termites. It is found as a solvent in ballpoint pens, and also is used in food and cosmetics. Termites have been known to follow the ink trail for at least 50 years.

Greg Henderson and his colleagues (Jian Chen and Roger Laine identified the trail pheromone mimic in pen ink as 2-phenoxyethanol. (Chen, J, G. Henderson, and R. Laine, 1998. Isolation and Identification of 2-phenoxyethanol from ballpoint pen ink as a trail-following substance of *Coptotermes formosanus* and *Reticulitermes*. J. Entomological Science 33:97-105

Greg Henderson et al. at LSU patented 2-phenoxyethanol applications to baits to specifically kill termites (patent is attached), but not soil treatments of the trail pheromone mimic to allow discovery and mortality of termites as part of a total program. See U.S. Pat. No. 6,352,703 to Henderson et al. issued Mar. 5, 2002, which is incorporated by reference. Henderson further patented a "POP-UP TERMITE INDICATOR" for monitoring termites in U.S. Pat. No. 6,266,918 to Henderson et al., which is incorporated by reference in its' entirety.

There is a patent on the use of the natural trail pheromone (dodecatrianol) for termite detection and control (see U.S. Pat. No. 5,024,832), but not for using 2-phenoxyethanol.

A May 2022 Thesis by L. Prescott, discussed, the use of 2-phenoxyethanol as a trail pheromone soil treatment to lead termites to pop-up termite detection stations. The project showed that termites will feed more on cellulose material surrounded by the treatment and in the field the treatment will lead them to detection stations (5 of 20 2-phenoxyethanol soil-treated stations hit, compared to 0 of 20 that were not treated. See Prescott, Luke, Master's Thesis for Soil Tunneling/Tubing by Subterranean Termites in Response to 2-phenoxyethanol, Department of Entomology and Nematology, University of Florida, May 2022.

Other scientists have discovered that termites detect and follow salts in soils that leach from logs as they decay. See Botch and Judd., Effects of Soil Cations on the Foraging Behavior of *Reticulitermes flavipes* (Isoptera: Rhinotermitidae). Ecology and Behavior, Journal of Economic Entomology, Vol. 104, No. 2, pages 425-435, April 2011. Potassium cations were the only ones to attract termites.

Scientists have also found that salts in sports drinks are followed by termites. These salts can include potassium salts that mimic the salts that leach from logs. We have hypothesized that by combining 2-phenoxyethanol and potassium salt, termites will reliably follow the trail to detection traps or termite treatments. See Cornelius et al., Efficacy of Bait Supplements for Improving the Rate of Discovery of Bait Stations in the Field by Formosan Subterranean Termites (Isoptera: Rhinotermitidae), Journal of Economic Entomology, Vol, 102, no. 3, pages 1175-1181, 2009.

The prior art ignores the fact that 2-phenoxyethanol is not closely related to the natural trail pheromone of termites, dodecatrianol. Glycols like 2-phenoxyethanol and potassium chloride or carbonate absorb moisture from the air or surrounding soil. Termites are, therefore, following an elevated water holding trail of high soil/wood moisture rather than a pheromone trail. Termites orient to high moisture and will follow soil/wood of elevated water content.

The prior art also applied a single concentration of 2-phenoxyethanol to the soil, ignoring the fact that some soils/wood (e.g., sand or pine) is more porous than other soils (e.g., clay or oak). Porosity of wood/soil is important because no single concentration of an applied product can provide the necessary high water content needed to affect termite behavior. Termites prefer to be in moist rather than dry soils, so they will follow a trail of high water content soil for detection or control. Therefore, the application of a single concentration of 2-phenoxyethanol and/or potassium salt to different soil types cannot deliver the correct amount of 2-phenonxyethanol and/or potassium salt to a volume of treated soil.

Also, there was no previous study that included 2 hygroscopic products, like 2-phenoxyethanol and potassium salts, to change the physical nature of soil/wood so water in the treated area has a higher water content than the surrounding soil/wood. No previous study has documented that the physical water holding nature of soil can be used to affect termite behavior.

No previous patent has demonstrated that surrounding a structure containing wood with a hygroscopic soil/wood treatment will lead termites to bait or toxicants and protect the structure from termite attack.

Thus, the need exists for solutions to the above problems with the prior art.

SUMMARY OF THE INVENTION

A primary objective of the present invention is to increase the physical water holding capacity of soil to direct termites to toxicants and/or detection devices using recruitment compositions, systems, devices, and methods that include between approximately 0.1% to approximately 2.0% of 2-phenoxyethanol dissolved in water, so the termites will reliably follow a higher soil water trail to termite toxicants, monitoring stations, and/or bait stations.

A secondary objective of the present invention is to provide variable application percentages and rates of stations. 2-phenoxyethanol and/or potassium salts dissolved in water, to form an elevated water holding trail for different soil types (sand, sandy & silty soil, Loam and clay soil) leading to termite toxicants, termite bait stations, and/or termite monitoring stations.

A third objective of the present invention is to provide a complete barrier around a structure so termites will be redirected due to elevated soil water concentrations that connect termite toxicants, monitoring stations and/or bait stations arranged about a perimeter of a wood containing structure.

A fourth objective of the present invention is to provide a complete barrier about wood trees so termites will be redirected due to elevated soil water concentrations that connect termite toxicants, monitoring stations and/or bait stations arranged about a perimeter of a wood tree or plurality of trees.

A fifth objective of the present invention is to provide a complete barrier about stacked cut wood so termites will be redirected due to elevated soil water concentrations that connect termite toxicants, monitoring stations and/or bait stations with toxicants arranged about a perimeter of stacked wood.

A sixth objective of the present invention is to provide a complete barrier about wood pallets with wood and/or boxes on the wood pallets so termites will be redirected due to elevated soil water concentrations that connect termite toxicants, monitoring stations and/or bait stations with toxicants arranged about a perimeter of wood pallet or wood pallets that support wood and/or boxes on the wood pallets A seventh objective of the present invention is to provide trails of 2-PE dissolved in water to direct termites to termite toxicants, monitoring stations and/or bait stations with toxicants, that can be located on wood-based house structures, piles of cut wood, wooden pallets, trees, boats, posts, fences.

An eighth objective of the present invention is providing a continuous trail of 2-PE dissolved in water surrounding a monitoring station or bait station with termite toxicants, wherein the trail can include a rectangular configuration or circular ring configuration, or another geometric configuration.

A preferred embodiment of the termite trailing and recruitment system, comprises:

a plurality of termite bait and monitoring stations positioned about a wood-containing structure; and a trail of 2 phenoxyethanol (2-PE) applied to soil between each of the termite bait and/or monitoring stations, wherein each trail directs termites away from the wood-containing structure to an individual termite bait and/or monitoring station.

The 2 phenoxyethanol (2-PE) ranges from approximately 0.1% to approximately 2% depending on the soil type and localized conditions.

The 2 phenoxyethanol (2-PE) is approximately 0.1% dissolved/suspended in water as the trail for sand soil.

The 2 phenoxyethanol (2-PE) is approximately 0.2% dissolved/suspended in water as the trail for sandy and silty soil.

The 2 phenoxyethanol (2-PE) is approximately 0.4% dissolved/suspended in water as the trail for loam soil.

The 2 phenoxyethanol (2-PE) is approximately 2% dissolved/suspended in water as the trail for clay soil.

The trail is approximately 10 to approximately 20 feet between each of the termite bait and/or monitoring stations.

The termite bait and monitoring stations are located up to approximately 10 to approximately 20 feet apart from one another in a perimeter about the wood-containing structure.

The 2 phenoxyethanol (2-PE) ranges from approximately 0.1% to approximately 2% depending on the soil type and localized conditions, and the trail is approximately 10 to approximately 20 feet between each of the termite bait and/or monitoring stations.

The 2 phenoxyethanol (2-PE) ranges from approximately 0.1% to approximately 2% depending on the soil type and localized conditions, and the termite bait and monitoring stations are located approximately 10 to approximately 20 feet apart from one another in a perimeter about the wood-containing structure.

A method for trailing and recruiting termites to termite bait and monitoring stations, comprises the steps of: providing a plurality of termite bait and monitoring stations positioned about a wood-containing structure; and applying a trail of a percentage 2 phenoxyethanol (2-PE) dissolved/suspended in water to soil located between each of the termite bait and monitoring stations, wherein each trail leads termites away from the wood-containing structure to an individual termite bait and/or monitoring station.

The percentage 2 phenoxyethanol (2-PE) dissolved in water ranges from approximately 0.1% to approximately 2% depending on the soil type and localized conditions.

The 2 phenoxyethanol (2-PE) is approximately 0.1% dissolved/suspended in water as the trail for sand soil.

The 2 phenoxyethanol (2-PE) is approximately 0.2% dissolved/suspended in water as the trail for sandy and silty soil.

The 2 phenoxyethanol (2-PE) is approximately 0.4% dissolved/suspended in water as the trail for loam soil.

The 2 phenoxyethanol (2-PE) is approximately 2% dissolved/suspended in water as the trail for clay soil.

The trail is approximately 10 to approximately 20 feet between each of the termite bait and/or monitoring stations.

The termite bait and monitoring stations are located up to approximately 10 to approximately 20 feet apart from one another in a perimeter about the wood-containing structure.

9A

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 5 is a diagram layout view of a house structure with termite monitoring or bait stations arranged about the perimeter, along with a 2-phenoxyethanol and/or potassium chloride elevated soil water trail connecting between each of the termite monitoring or bait stations.

DESCRIPTION OF THE PREFERRED EMBODIMENTS

Figure 1:
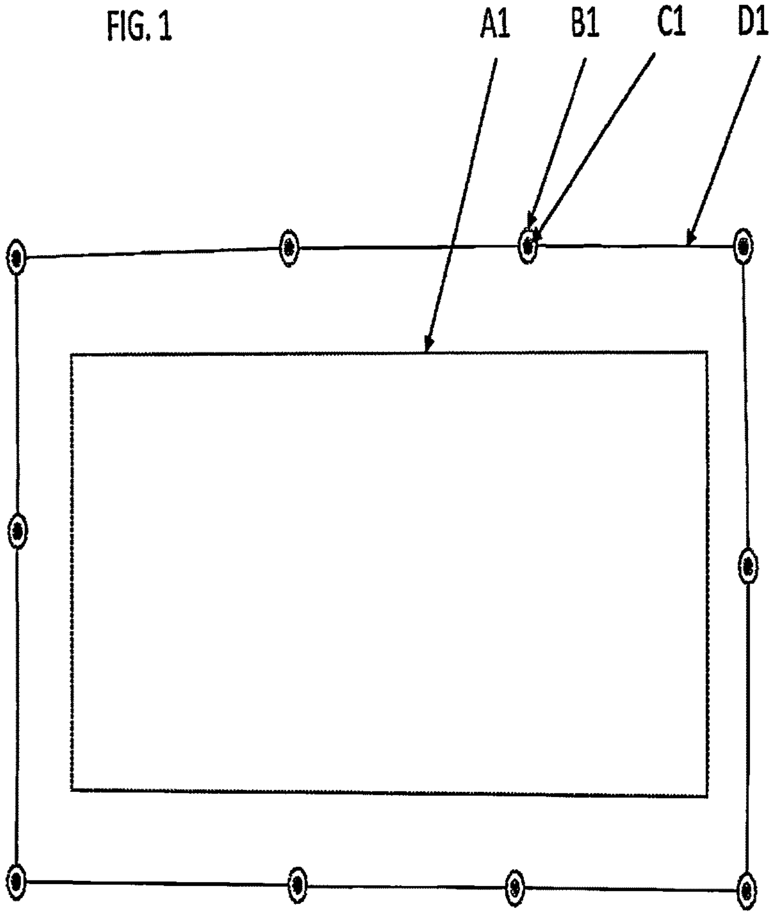
FIG. 1 shows a diagrammatic layout view of the novel termite treatment composition applied to soil between termite treatment devices spaced about an exterior of a rectangular structure to be protected.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale. For ease of notation, 2-phenoxyethanol is referred to as 2PE, potassium chloride is referred to as KCl, and potassium carbonate is referred to K2CO3.

A list of the components in the figures will now be described.

A1 Rectangular house or structure
B1 Termite bait stations/termite detection stations
C1 Termite bait matrix or termite detection device
D1 Termite hydroscopic soil treatment product applied to soil that connects stations
A2 Termite infested wood
B2 Termite tunnel in wood
C2 Termite treatment product injected into tunnel and absorbed in wood
D2 Termite bait station attached to wood surface.

A first embodiment of the termite trail pheromone mimic would be diluted in water using-phenoxyethanol between approximately 280 ppm to approximately 2000 ppm and is dissolved in water and applied to soil surrounding a location for detecting termites or killing termites.

A preferred amount of the 2-phenoxyethanol would be dependent on soil type. For instance, it would include approximately 0.1% or 1,000 ppm, and is dissolved in water and applied to sandy soil surrounding a location for leading the termites to a termite toxicant, bait station or detection station. For clay soil, approximately 2% or 20,000 ppm of 2-phenoxyethanol dissolved in water would be applied to soil surrounding a location for leading termites to a toxicant, bait station, and/or detection station.

A second embodiment of the novel termite trail pheromone mimic would be diluted in water using 2-phenoxyethanol dissolved in water at approximately 1000 ppm in combination with potassium carbonate or potassium chloride (KCl or K2CO3) at (between approximately 0.129% or 129 ppm) and applied to sandy soil surrounding a location for detecting termites or killing termites. For clay soil, approximately 2.58% or 25,800 ppm of KCL or K2CO3 dissolved in water would be applied to soil surrounding a location for leading termites to a toxicant, bait station, and/or detection station.

The combination of 2-phenoxyethanol dissolved in water, with potassium carbonate or potassium chloride (KCl or K2CO3), can be injected into wood for wood treatment in order for drywood termites to follow a water gradient to a toxicant or bait station.

FIG. 1 shows a diagrammatic layout view of the novel termite treatment composition applied to soil between termite treatment devices B1/C1 spaced about an exterior structure A1 to be protected.

The termite treatment devices B1/C1 can include but not be limited to B1 termite bait stations and/or termite detection stations, and C1 termite bait matrix and/or detection devices.

U.S. Pat. No. 6,266,918 to Henderson, which is incorporated by reference, teaches about how 2-PE can be applied directly to termite baits improve foraging activity. The Henderson '918 patent did not address the application of 2-PE to soil, only to termite baits directly. U.S. Pat. No. 8,111,155 to Barber, which is incorporated by reference describes a design of a station to contain termite bait.

A termite bait station referenced in FIG. 1 can include but is not limited to U.S. Pat. RE40,884 to Masterson, which is incorporated by reference.

A termite detection station, referenced in FIG. 1 can include but is not limited to U.S. Published Patent Application 2006/0207164A1 to Pearson, which is incorporated by reference. Additional termite bait stations with toxicants, can include, but are not limited to U.S. Pat. No. 8,111,155 to Barber, which is incorporated by reference in its' entirety, and U.S. Published Patent Application 2002/0116866 to Aesch, J R. et al., which is incorporated by reference in its' entirety.

A termite bait matrix referenced in FIG. 1, can include, but is not limited to, U.S. U.S. Pat. No. 6,585,991 B1 to Rojas et al., which is incorporated by reference.

A detection device referenced in FIG. 1, can include, but is not limited to U.S. Pat. No. 6,266,918 to Henderson, which is incorporated by reference.

The structure A1 to be protected can include a house or other wood framed structure.

The termite treatment devices B1/C1 are generally spaced apart from one another exterior to the outside perimeter of the structure A1.

Figure 2:
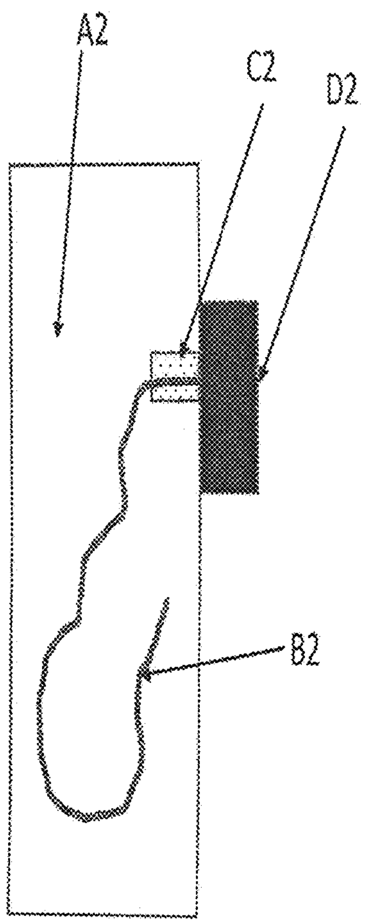
FIG. 2 shows a diagrammatic layout view of the novel termite treatment composition injected into a termite tunnel within termite infested wood adjacent to a termite bait station attached to the wood surface.

The composition (2-phenoxyethanol would include approximately 1,000 ppm, and is dissolved in water) can be used in both applications to sandy soil shown in FIG. 1 and FIG. 2.

The user can apply the novel treatment composition of the first embodiment referenced above to the surface of the soil between the treatment devices B1/C1.

The above composition can apply under pressure to the soil surface using a tank, pump and hose assembly, or simply poured onto the soil. Alternately, in can be applied in a trench dug in the soil using a spray assembly or pouring from a reservoir of the composition.

The above composition can also be injected under the ground for the FIG. 2 application. The composition can be Injected into wood as per FIG. 2 with traditional pest control equipment that applies product under pressure, and it can be injected into the soils as previously described.

Referring to FIGS. 1 and 2, either of the referenced compositions can be applied between bait or monitoring stations to completely surround a structure or area of termite concern, in order lead termites into stations.

FIG. 2 shows a diagrammatic layout view of the novel termite treatment composition C2 injected into a termite tunnel within termite infested wood A2 adjacent to a termite bait station D2 attached to the wood surface.

A bait station D2 referenced in FIG. 2 can include, but is not limited to U.S. Pat. No. 6,370,812B1 to Burns et al., which is incorporated by reference.

The second embodiment of the novel termite trail pheromone mimic would be diluted in water using 2-phenoxyethanol dissolved in water at approximately 1000 ppm in combination with potassium carbonate or potassium chloride (KCl or K2CO3) at (between approximately 129 to approximately 500 ppm) and injected into termite infested wood adjacent to a termite bait station.

A preferred amount of the potassium carbonate or potassium chloride (KCl or K2CO3) would be approximately 500 ppm.

The combination of 2-phenoxyethanol dissolved in water, with potassium carbonate or potassium chloride (KCl or K2CO3), can be injected into wood to form an elevated wood water concentration in order to lead drywood termites to a bait station or for wood treatment.

The second composition 2-phenoxyethanol dissolved in water with potassium carbonate or potassium chloride) can be used in both FIG. 1 and FIG. 2 applications. For the FIG. 1 application, the second composition can be applied to the soil as previously described.

The second composition 2-phenoxyethanol dissolved in water with potassium carbonate or potassium chloride) can be injected into termite galleries using a syringe or spray assembly. The termite galleries would be adjacent to the termite bait station and attached to the damaged wood.

Testing of the novel termite trailing and recruitment compositions took place at the New Orleans Mosquito, Termite and Control District in New Orleans, Louisiana from Jun. 16 to Jun. 20, 2023.

The objective of the tests was to determine which prepared formulation of composition product most attracts and induces feeding behavior in Formosan subterranean termites.

Species:

For this protocol, individuals from a single colony of Formosan subterranean termites, *Coptotermes formosanus*, were used. Termites were collected from previously established field collection crates in New Orleans. This study was initiated within 3 days of termite collection.

Treatments:

The following ready-to-use solutions were tested for this study:

1. Composition according to the invention. Composition according to the invention 2Pe 0.1%
2. Composition according to the invention. Composition according to the invention 2PE+$K_2CO_3$ 0.05%
3. 2PE+KCl 0.05%
4. Water (untreated control)

Replicates:

There were 10 replicates for each choice test. Each choice test involved a combination of two of the treatments to be tested, listed in the previous section. The following is a summary Table A of each replicate for this study.

TABLE A

| Treatment A | Treatment B | No. replicates |
|---|---|---|
| Composition according to the invention Composition according to the invention 2PE 0.1% | Composition according to the invention Composition according to the invention + $K_2CO_3$ 0.05% | 10 |
| Composition according to the invention: 2PE + $K_2CO_3$ 0.05% | Composition according to the invention Composition according to the invention + KCl 0.05% | 10 |
| Composition according to the invention Composition according to the invention 2Pe 0.1% | Composition according to the invention Composition according to the invention + KCl 0.05% | 10 |
| Composition according to the invention Composition according to the invention 2Pe 0.1% | Water (untreated control) | 10 |
| Composition according to the invention Composition according to the invention 2PE + $K_2CO_3$ 0.05% | Water (untreated control) | 10 |
| Composition according to the invention Composition according to the invention 2PE + KCl 0.05% | Water (untreated control) | 10 |
| | | Total = 60 |

A total of 60 replicates were performed for this study.

Arena Setup:

2-D termite foraging arenas consisting of two clear acrylic plates (24 cm×24 cm) separated by spacers and were secured together with bolts. Each arena contained moistened sand and filter paper circles. The sand around each paper filter circle was treated with the pre-designated treatment.

To assemble each arena, first the top plate was placed face-down and moistened with distilled water using a spray bottle. Two pieces of filter paper (55 mm diameter) were placed directly onto the top plate. These two pieces of filter paper were placed in such a way as to be equidistant from the release chamber and from the sides. Filter papers were approximately 10 cm from the release chamber and approximately 5 mm from the arena sides. Sand was scattered over this plate, and excess sand was leveled off using a straight edge. The sand surface was misted again with distilled water using a spray bottle to the point of being damp without any runoff. A treated trail of pre-designated product was then pipetted on the sand around the circumference of the filter paper circles at a rate of approximately 0.18 mL/cm. For each replicate, the location of Treatment A and Treatment B alternated. The bottom plate was then secured to the top of the arena and flipped over.

Filter Paper:

Filter paper used in this study was approximately 55 mm in diameter. It was oven dried at approximately 120° C. for approximately 2 hours and weighed prior to placing them in each arena. It was dried, cleaned, and weighed again at the conclusion of this study, after being exposed to termites for 4 days.

Bioassay:

500 Formosan subterranean termites consisting of a 10% soldier ratio (450 workers:50 soldiers) were placed into the release chamber of each of the 60 replicates and the lid placed on the release chamber. Arenas were maintained in an environmental chamber at 28° C. and 80% RH for 4 days. At that time, arenas were disassembled, and filter paper collected, cleaned of sand residue, dried, and weighed.

Figure 3:
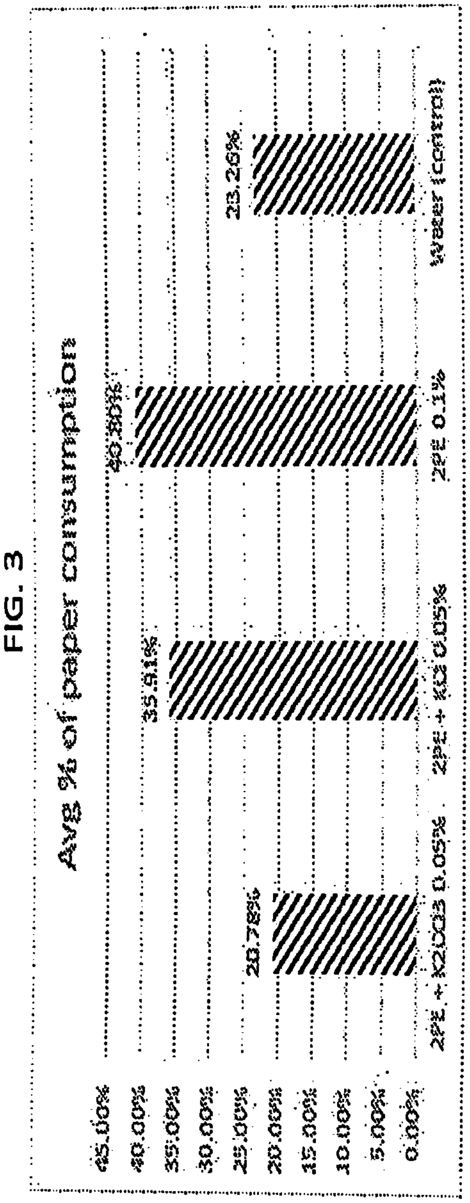
FIG. 3 is a graph showing the average percent of paper consumed by termites with the novel 2-phenoxyethanol and/or potassium chloride composition and soil treatment that elevated soil water concentrations and resulted in recruited of termites to the paper water concentrations compared to untreated control repetitions.

Data Collection:

The following data points were collected for each replicate:

1. Treatment A filter paper dry weight before termite exposure
2. Treatment A filter paper dry weight after termite exposure
3. Weight of filter paper consumed (Treatment A)
4. Percent consumption for Treatment A filter paper
5. Treatment B filter paper dry weight before termite exposure
6. Treatment B filter paper dry weight after termite exposure
7. Weight of filter paper consumed (Treatment B)
8. Percent consumption for Treatment B filter paper FIG. 3 is a graph showing the average percent of paper consumption from termites with the novel trailing and recruitment compositions in the invention. The results teach us that 2-PE and 2-PE+KCl increased termite activity and the percentage of paper consumption significantly when soil around the termite food source was treated.

Figure 4:
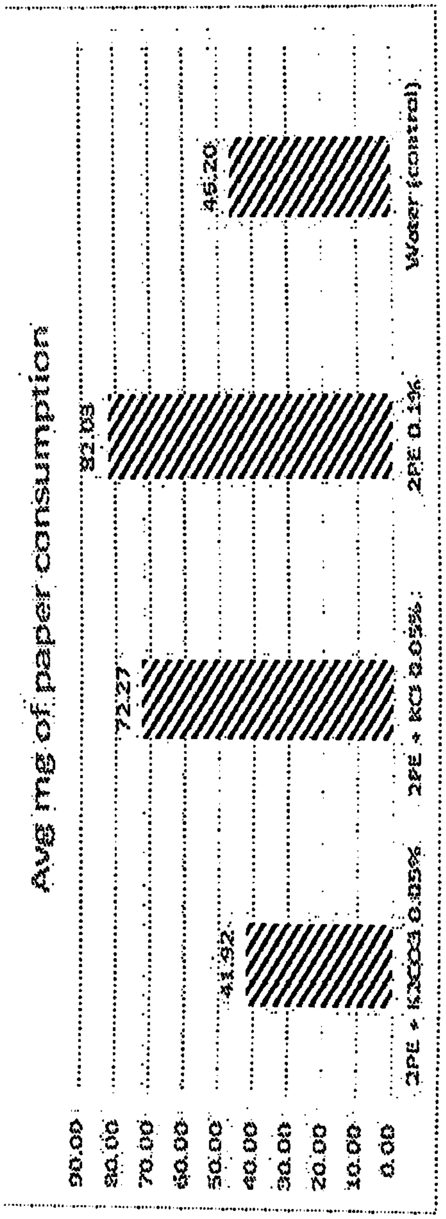
FIG. 4 is a graph showing the average mg of paper consumed by termites with the novel 2-phenoxyethanol and/or potassium chloride composition and soil treatment that elevated soil water concentrations and resulted in recruited of termites to the paper water concentrations compared to untreated control repetitions.

FIG. 4 is a graph showing the average mg of paper consumption with the novel trailing and recruitment compositions in the invention. The results teach us that 2-PE and 2-PE+KCl increased termite activity and the mg of paper consumption significantly when soil around the termite food source was treated.

Results

Completed data sheets of each arena were compiled after 4 days of termite activity.

Analysis of variance (ANOVA) followed by post-hoc Tukey test using SigmaPlot (Systat Software, Inc.) yielded a significant difference in weight of filter paper consumed across all treatments ($H=16.751$, $df=3$, $P<0.001$). TABLE B below shows differences between treatments:

TABLE B

| Treatment | Mean Weight Consumed (g) + SD. Different letters indicate significant differences according to Tukey's post hoc differentiation after ANOVA |
|---|---|
| Composition according to the invention: 2PE + 2Pe 0.1% | 0.0820 + 0.0473 A |

TABLE B-continued

| Treatment | Mean Weight Consumed (g) + SD. Different letters indicate significant differences according to Tukey's post hoc differentiation after ANOVA |
|---|---|
| Composition according to the invention: 2PE + $K_2CO_3$ 0.05% | 0.0419 + 0.0266 C |
| Composition according to the invention: 2PE + KCl 0.05% | 0.0723 + 0.0424 AB |
| Water | 0.0462 + 0.0361 BC |

From this data analysis, it can be determined that termites fed more on filter paper surrounded by the Composition according to the invention 2Pe 0.1% and Composition according to the invention 2Pe+KCl 0.05% than any other treatment, and there was not a significant difference in feeding between these two aforementioned treatments. Termites even preferred Composition according to the invention 2Pe 0.1% to water as well, though there was no such preference Composition according to the invention 2Pe+KCl 0.05% over water. Termites did not feed significantly more on filter paper surrounded by Composition according to the invention 2Pe+$K_2CO_3$ 0.05% when compared to any other treatment.

The trials prove that termites consume more treated filter paper media when 2Pe and 2Pe+KCl are present around the paper. The amount consumed is almost twice as much as untreated controls ($H_2O$).

FIG. 5 is a diagram layout view of a house structure with termite monitoring or bait stations arranged about the perimeter, A along with a surface applied continuous Phenoxyethanol trail C connecting between each of the termite monitoring or bait stations. B. FIG. 5 is a diagram of connecting monitoring or bait stations B around a house perimeter A with a continuous connecting trail C to prevent termites from tunneling between stations B.

Referring to FIG. 5, the house structure A, can include a wood frame and/or siding (wood-containing structure), and can have a footprint of approximately 30 feet wide by approximately 50 feet long. Each of the termite monitoring or bait stations B can be spaced approximately 20 feet apart from one another spaced outside the footprint A of the wood containing structure. The surface applied continuous connecting trail C between termite monitoring or bait stations B, together form a closed loop perimeter spaced outside footprint A of the wood containing structure. Each continuous connecting trail directs termites away from the wood-containing structure and directly to an adjacent one of the individual termite monitoring or bait stations.

The preferred spacing between monitoring or bait stations is approximately 10-20 ft.

Between each of the termite monitoring or bait stations B, can be a trail of Phenoxyethanol or 2Pe+KCl for connecting the stations to one another. The trail C can lead termites to the termite monitoring or bait stations B, and away from the structure A.

TABLE C is a table of the Variable application rates of 2 phenoxyethanol (2-PE) based on soil type. Concentration of dilution applied varies from approximately 0.1% to approximately 2.0% depending on soil conditions. Total water to move 2-PE into the ground remains constant.

TABLE C

| Soil type | Infiltration rate (Hillel 1982) | Gallons of dilution/10 ft | ml of 2-PE in dilution | % 2PE | Water (gal/10 ft) to apply after treatment | Total dilution + water |
|---|---|---|---|---|---|---|
| Sand | Approx. 0.8 | Approx. 4 | Approx. 15.14 | 0.1 | 0 | Approx. 4 |
| Sandy & silty soil | Approx. 0.4 | Approx. 2 | Approx. 15.14 | 0.2 | Approx. 2 | Approx. 4 |
| Loam | Approx. 0.2 | Approx. 1 | Approx. 15.14 | 0.4 | Approx. 3 | Approx. 4 |
| Clay soil | Approx. 0.04 | Approx. 0.2 | Approx. 15.14 | 2 | Approx. 3.8 | Approx. 4 |

Table C shows the variable application rates for 4 soil types, which includes Sand, Sandy & silty soil, Loam, and Clay soil.

The infiltration rates for the four (4) soil types in Table C are from the published water infiltration rates which have support from Table 3 of the Soil Infiltration Brochure, Guides for Educators, May 2014 published by the United States Department of Agriculture, National Resources Conservation Service (NRCS) Guides for Educators, May 2014, seven pages. The infiltration rates are from a textbook. It is "Introduction to Soil Physics" by Daniel Hillel, 1982 Academic Press, 392 pages.

The infiltration rates provide a guide to the general permeability of soil types on which to assess the necessary concentration and volume if 2-PE and KCl and/or K2CO3.

In order to have the product not pool on the soil surface and spread out rather than percolate into the soil, we have varied the percentage of 2-PE in the application volume to deliver the same amount of 2 phenoxyethanol per 10 linear feet to the different soil types. To compensate for the lower amounts of water for the soils that have lower water infiltration rates, we have calculated the amount of water that should be used to irrigate the soil and move the treatment down to the position of subterranean termites below the soil surface. The concentrations recommended go from approximately 0.1% to approximately 2%. A concentration of approximately 0.08 to approximately 0.2% could be used.

Various Soil Treatment Methods will now be described.

Sandy Soil Treatment Method. A treatment with the current invention could be applied to sandy soil in the following manner. Monitoring/bait stations would be placed in the sandy soil around a structure and spaced approximately 20 ft apart. In a spray tank, A volume of 15.14 ml of 2Pe would be added for every 10 ft to be treated to connect the stations. The water would be added to the spray tank to achieve 4 gallons of total solution per 10 linear ft or 0.1% solution. The 4 gallons of 0.1% solution would be poured or sprayed onto the soil surface to create an uninterrupted line between the bait/monitoring stations. No additional water would be added to the treatment line The solution would wet the soil to a depth of 2-6 inches where termites actively tunnel. The termites would then follow the treated line to the bait/monitoring stations.

Sandy Silty Soil Treatment Method. A treatment with the current invention could be applied to sandy silty soil in the following manner. Monitoring/bait stations would be placed in the sandy silty soil around a structure and spaced approximately 10-20 ft apart. In a spray tank, A volume of 15.14 ml of 2Pe would be added for every 10 ft to be treated to connect the stations. The water would be added to the spray tank to achieve 2 gallons of total solution per 10 linear ft or 0.2% solution. The 2 gal of 0.2% solution per 10 linear ft would be poured or sprayed onto the soil surface to create an uninterrupted line between the bait/monitoring stations. After applying the 2Pe solution, 2 gal of water per 10 linear ft would be applied to the treated line in order to slowly move the treatment vertically into the soil profile without horizontal runoff. The solution would wet the soil to a depth of 2-6 inches where termites actively tunnel. The termites would then follow the treated line to the bait/monitoring stations.

Loam Soil Treatment Method. A treatment with the current invention could be applied to loam soil in the following manner. Monitoring/bait stations would be placed in the loam soil around a structure and spaced approximately 10-20 ft apart. In a spray tank, A volume of 15.14 ml of 2Pe would be added for every 10 ft to be treated to connect the stations. Water would be added to the spray tank to achieve 1 gallon of solution per 10 linear ft or 0.4% solution The 1 gallon of 0.4% solution would be poured or sprayed onto the soil surface to create an uninterrupted line between the bait/monitoring stations. After applying the 2Pe solution, 3 gal of water would be applied to the treated line in order to slowly move the treatment vertically into the soil profile without horizontal runoff. The solution would wet the soil to a depth of 2-6 inches where termites actively tunnel. The termites would then follow the treated line to the bait/monitoring stations.

Clay Soil Treatment Method. A treatment with the current invention could be applied to clay soil in the following manner. Monitoring/bait stations would be placed in the clay soil around a structure and spaced approximately 10-20 ft apart. In a spray tank. A volume of 15.14 ml of 2Pe would be added for every 10 ft to be treated to connect the stations. The water would be added to the spray tank to achieve 0.2 gallon of total solution per 10 linear ft or 2% solution. The 2% solution would be poured or sprayed onto the soil surface to create an uninterrupted line between the bait/monitoring stations. After applying the 2PE solution, a volume of 3.8 gal of water would be applied to the treated line in order to slowly move the treatment vertically into the soil profile without horizontal runoff. The solution would wet the soil to a depth of 2-6 inches where termites actively tunnel. The termites would then follow the treated line to the bait/monitoring stations.

Figure 6A:
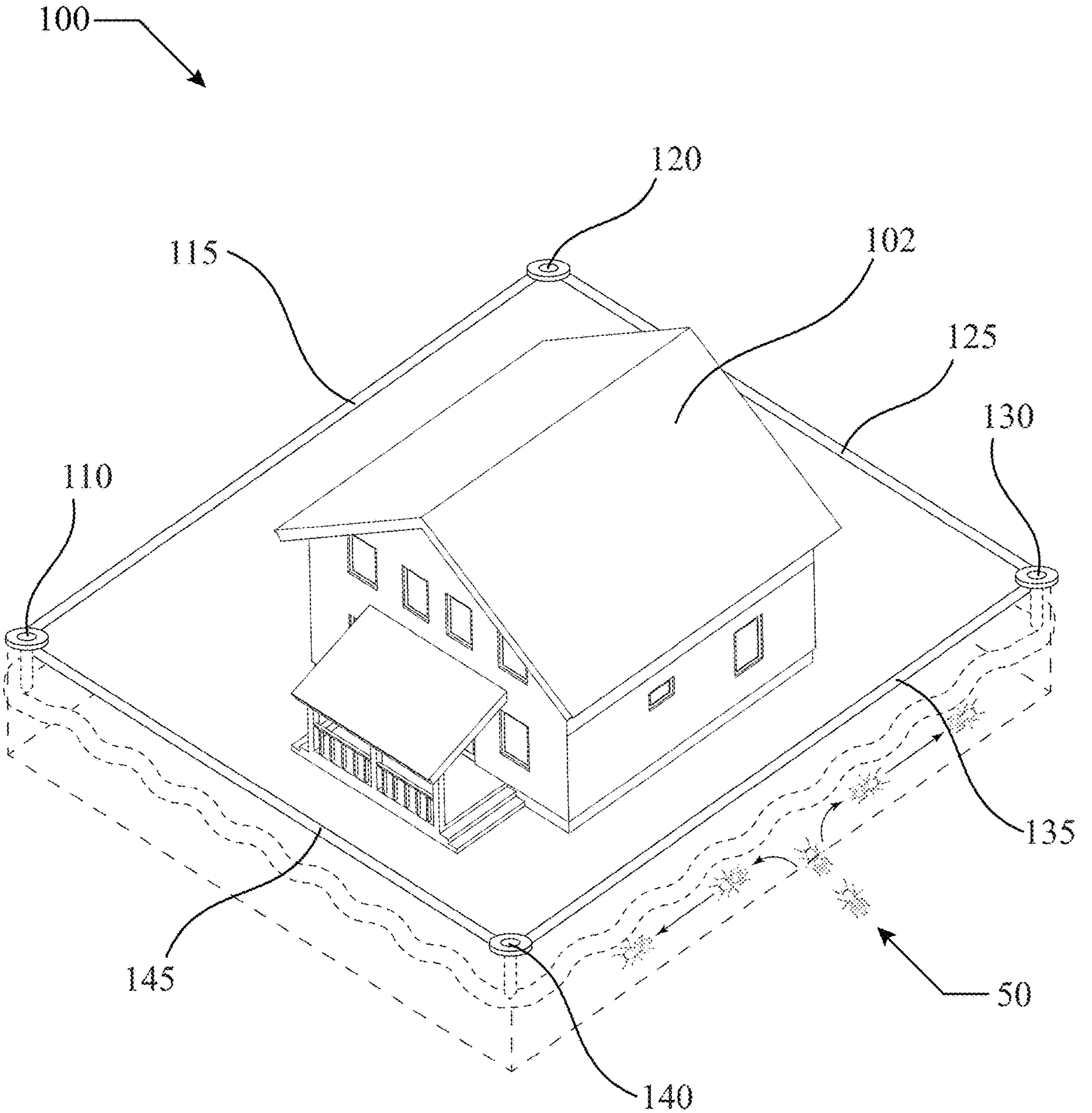
FIG. 6A is a perspective view of a wood-based house structure surrounded by spaced apart termite monitoring or bait stations with a 2-phenoxyethanol (2PE) dissolved in water trails connecting each of the termite monitoring or bait stations.

FIG. 6A is a perspective view 100 of a wood-based house structure 102 surrounded by spaced apart termite monitoring or bait stations 110, 120, 130, and 140 with a 2-phenoxyethanol (2PE) dissolved in water trails 115, 125, 135, 145 connecting each of the termite monitoring or bait station 110, 120, 130, and 140. Termites 50 are shown passing into tunnels in different soils generally between the termite monitoring or bait station 110, 120, 130, and 140.

As previously described, U.S. Pat. No. 8,111,155 to Barber, which is incorporated by reference describes a design of a station to contain termite bait. A termite bait station can include but is not limited to U.S. Pat. RE40,884 to Masterson, which is incorporated by reference. A termite bait and monitoring station, can include but is not limited to U.S. Published Patent Application 2006/0207164A1, which is incorporated by reference.

A detection device referenced in FIG. 1 can include, but is not limited to U.S. Pat. No. 6,266,918 to Henderson, which is incorporated by reference.

The termite monitoring or bait station 110, 120, 130, and 140 are to be located at least approximately 18 inches up to approximately 6 to approximately 10 feet outside of the base of the wood-based house structure 102.

Each of the 2-phenoxyethanol (2PE) dissolved in water trails 115, 125, 135, 145 can intercept termites that try to pass between each of the termite monitoring or bait station 110, 120, 130, and 140, so that the trails 115, 125, 135, 145 will direct the termites to adjacent termite monitoring or bait station 110, 120, 130, and 140.

Figure 6B:
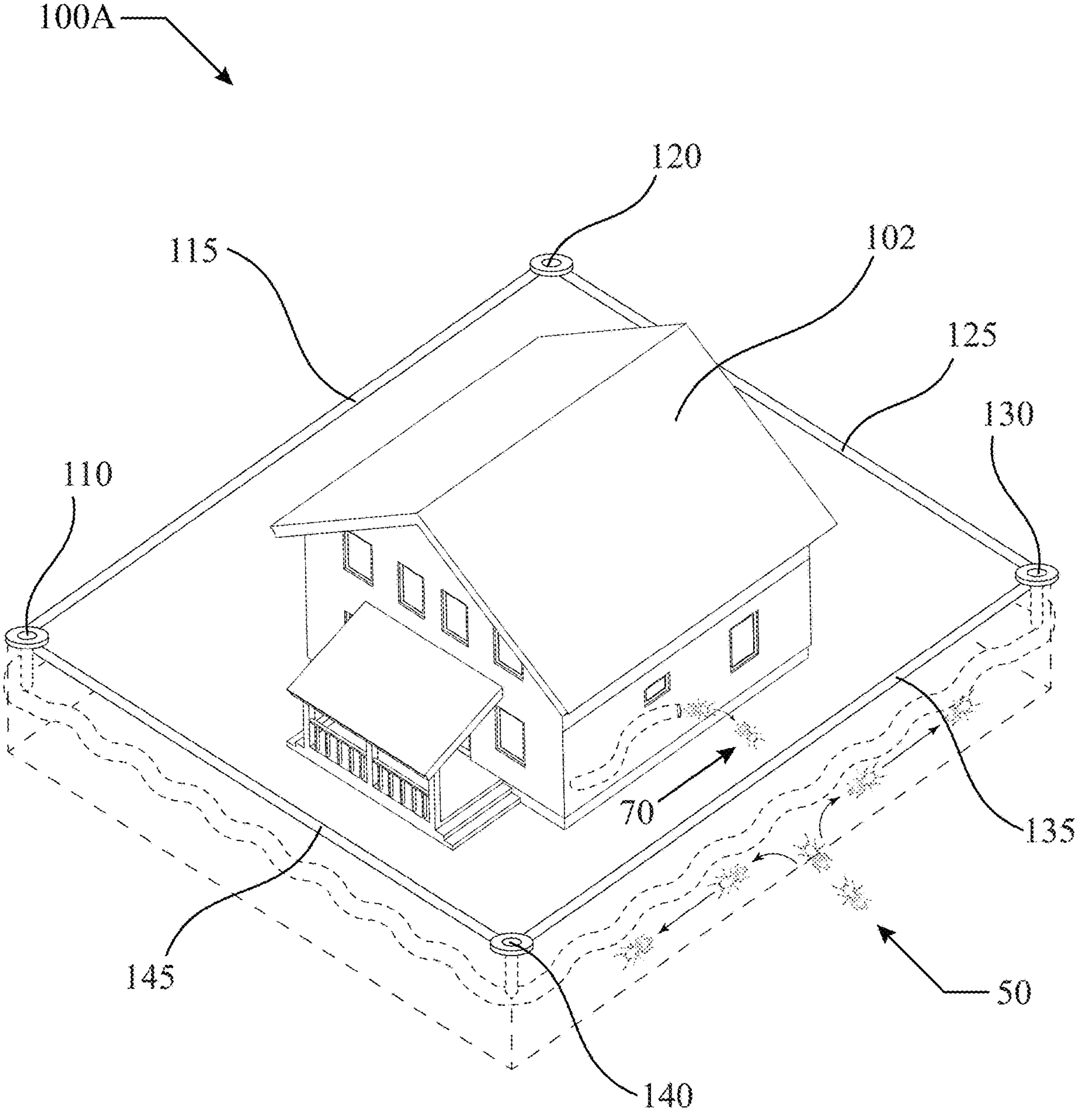
FIG. 6B is another perspective view of the wood-based house structure of FIG. 6A surrounded by the termite monitoring or bait stations, with termites in the structure being attracted to 2PE water trails

FIG. 6B is another perspective view 100A of the wood-based house structure 102 of FIG. 6A surrounded by the termite monitoring or bait stations 110, 120, 130, 140, with termites 70 in the wood-based house structure being attracted to 2PE water trails 115, 125, 135, and 145.

Referring to FIGS. 6A-6B, while the configuration of the termite monitoring or bait stations 110, 120, 130, 140, are shown to be rectangular, other geometric configurations for surrounding a wood-based house structure can be used.

For example, three the termite monitoring or bait stations can be used in a generally triangular configuration surrounding a wood-based house structure, wherein 2PE dissolved in water trails can be continuously used between each of the termite monitoring or bait stations.

As few as two termite monitoring or bait stations with toxicants can be used in an oval, or circular configuration surrounding a wood-based house structure, wherein 2PE dissolved in water trails can be continuously used between each of the termite monitoring or bait stations.

Additionally, more than four termite monitoring or bait stations with toxicants can be used to surround a wood-based house structure, as needed, where 2PE dissolved in water trails can be continuously used between each of the termite monitoring or bait stations.

Figure 7A:
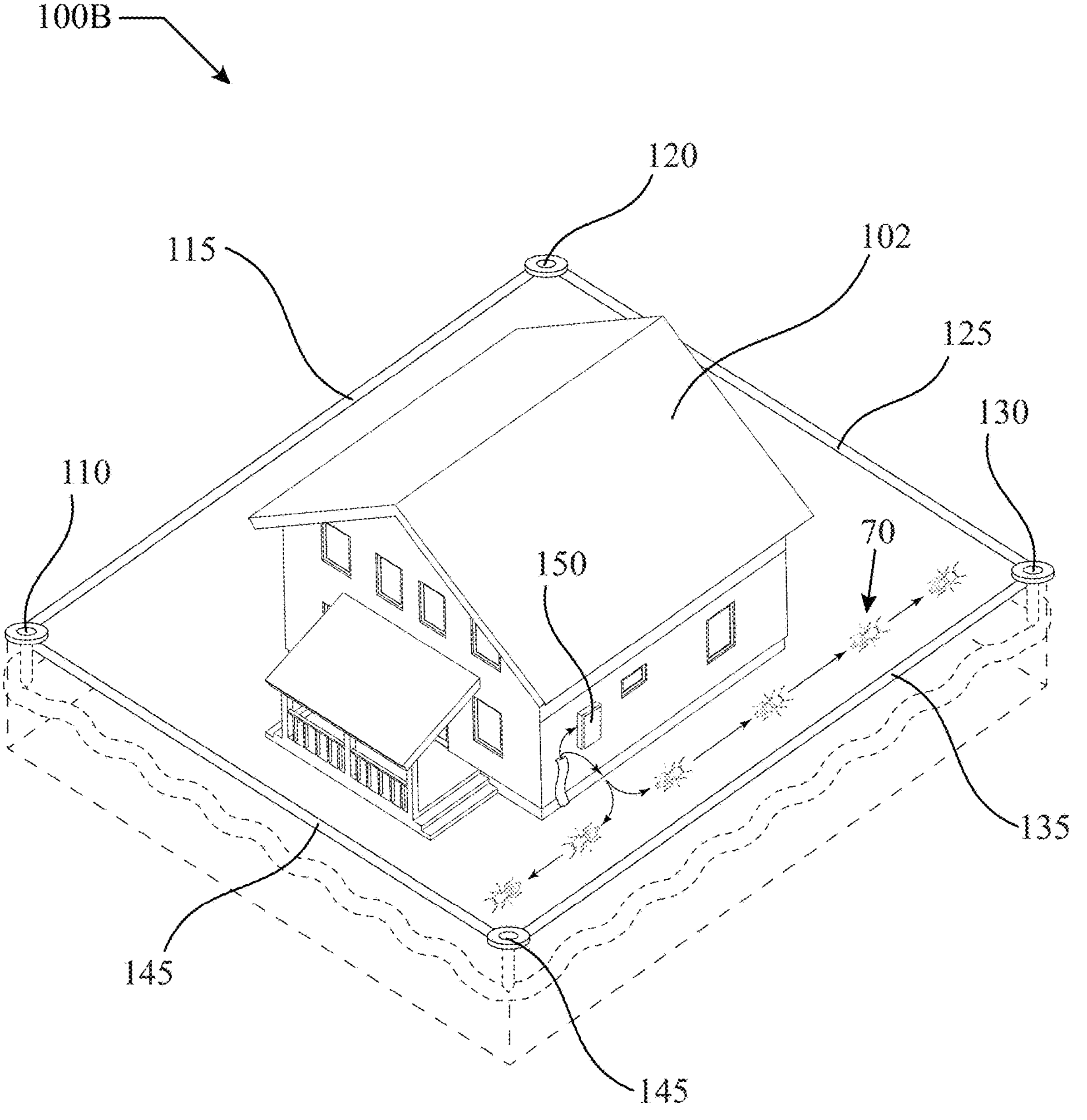
FIG. 7A is another perspective view of the wood-based house structure of FIG. 6A surrounded by the termite monitoring or bait stations, with termites in the structure being further attracted to a termite monitoring or bait station box mounted on the house.

FIG. 7A is another perspective view 100B of the wood-based house structure 102 of FIG. 6A surrounded by the termite monitoring or bait stations with toxicants 110, 120, 130, 140, with termites in the structure 70 being further attracted to a termite monitoring or bait station box 150 mounted on the wood-based house structure 102.

In addition to previously referenced termite monitoring and termite bait stations with toxicants, above ground termite monitoring or bait stations with toxicants, can include but are not limited to U.S. Pat. Nos. 6,233,865 and 6,370,814 to Curtis et al., which are both incorporated by reference in their entirety, and U.S. Published Patent Application 2017/0105403 to Azzarello et al., which is incorporated by reference in its' entirety.

Figure 7B:
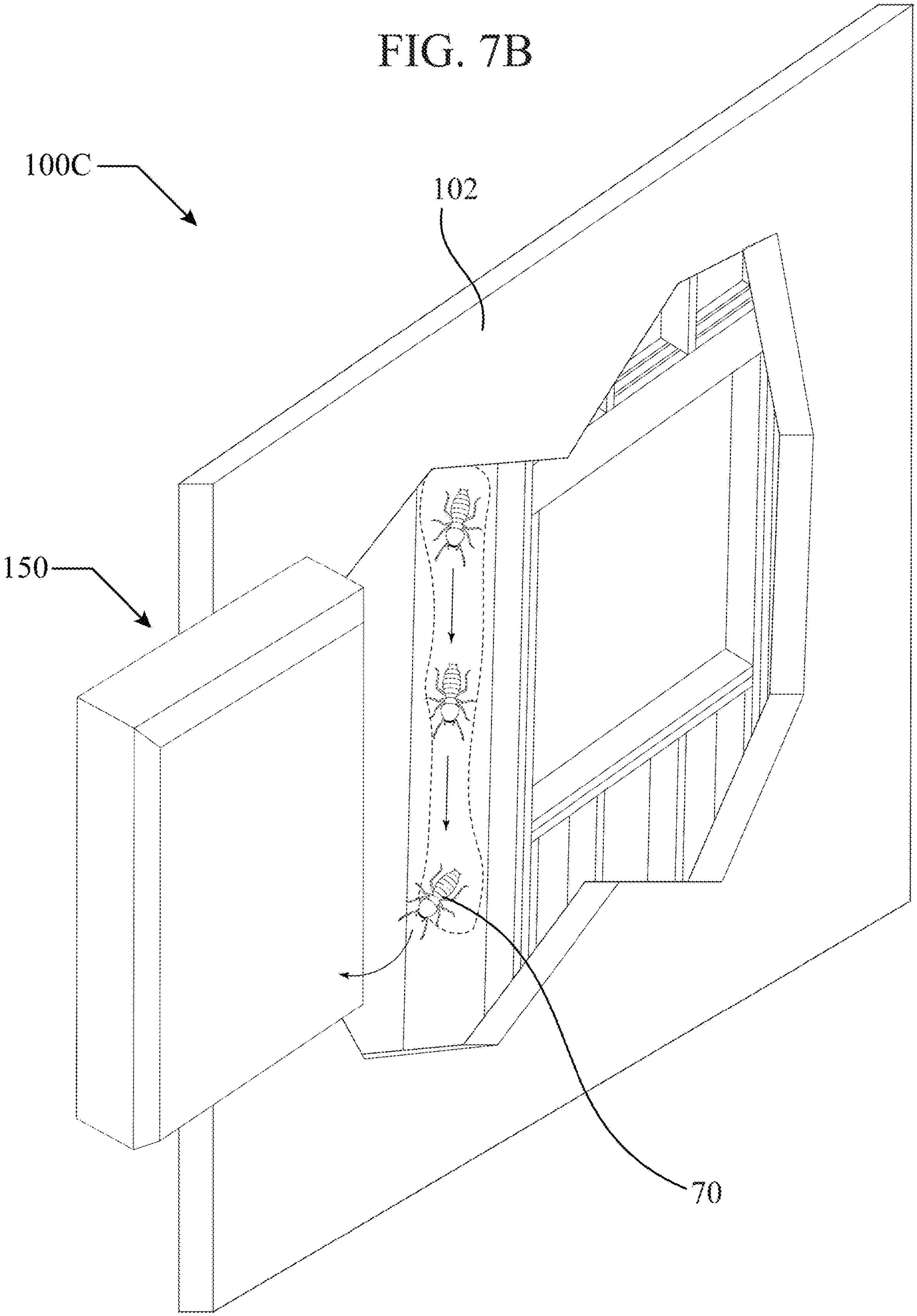
FIG. 7B is an enlarged perspective and partial interior view of FIG. 7A showing termites in the wood-based house structure adjacent the termite monitoring or bait station box mounted on the wood-based house structure.

FIG. 7B is an enlarged perspective and partial interior view 100C of FIG. 7A showing termites 70 in the wood-based house structure 102 adjacent a termite monitoring or bait station box 150 mounted on the outside of the wood-based house structure 102.

Figure 7C:
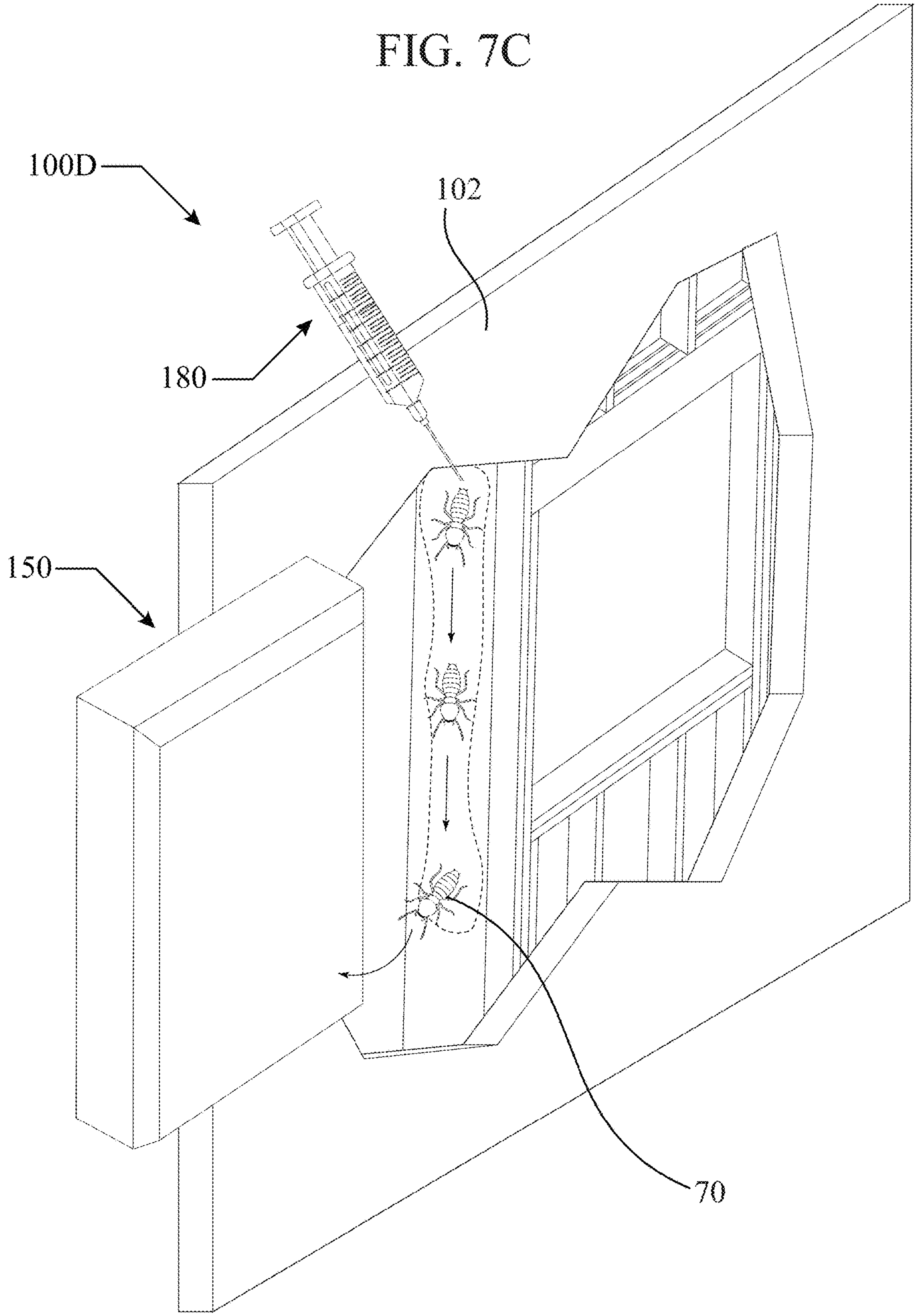
FIG. 7C is another view of FIG. 7B showing a syringe injecting the 2-PE dissolved in water solution injected into a termite gallery to recruit termites to the termite monitoring or bait station box mounted on the wood-based house structure.

FIG. 7C is another view 1002D of FIG. 7B showing a syringe 180 injecting the 2-PE dissolved in water solution being injected into a termite gallery 70 to recruit termites to the termite monitoring or bait station box 150 mounted on the wood-based house structure 102.

The injected trail of 2-PE dissolved in water solution will direct the termites in the termite galley to the termite monitoring or bait station box 150.

Alternatively, the solution of 2-PE dissolved in water can be sprayed along the outer surface of the wood-based house structure to create a trail leading to the termite monitoring or bait station with toxicant.

Figure 8A:
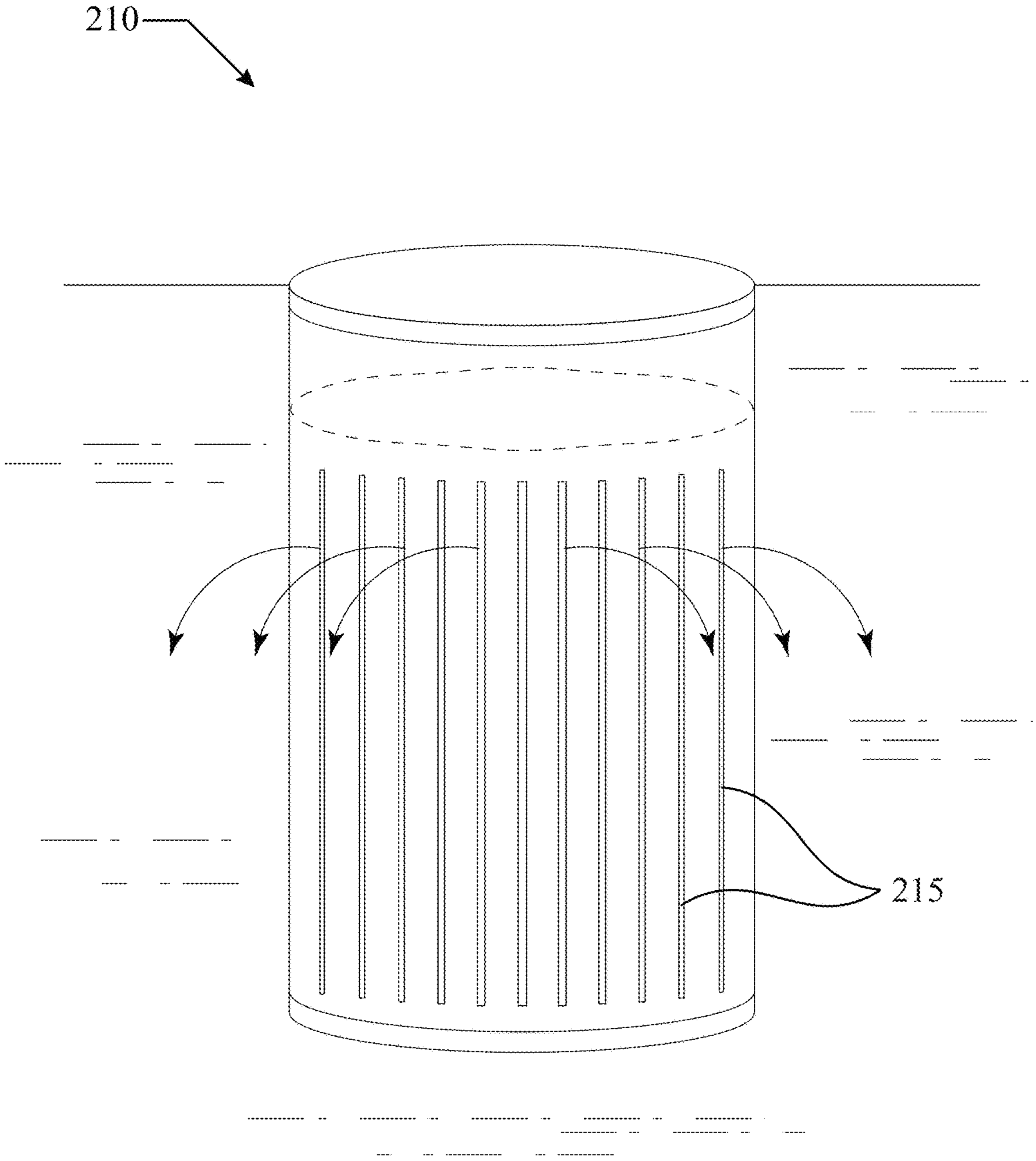
FIG. 8A is a perspective view of an inground cylindrical dispenser with side slits for releasing a solution of 2-PE dissolved in water solution into surrounding soil.

FIG. 8A is a perspective view of an inground cylindrical dispenser 210 with vertical side slits 215 for releasing a solution of 2-PE dissolved in water solution into surrounding soil.

The cylindrical dispenser 210 with vertical side slits 215 can be placed adjacent to termite monitoring or bait stations with toxicants that were previously described, so the released solution attracts termites to the termite monitoring or bait stations having toxicants. The placement can be between approximately 4 inches to approximately 6 feet. The treated soil would lead the termites to the monitoring or bait stations with toxicants.

Figure 8B:
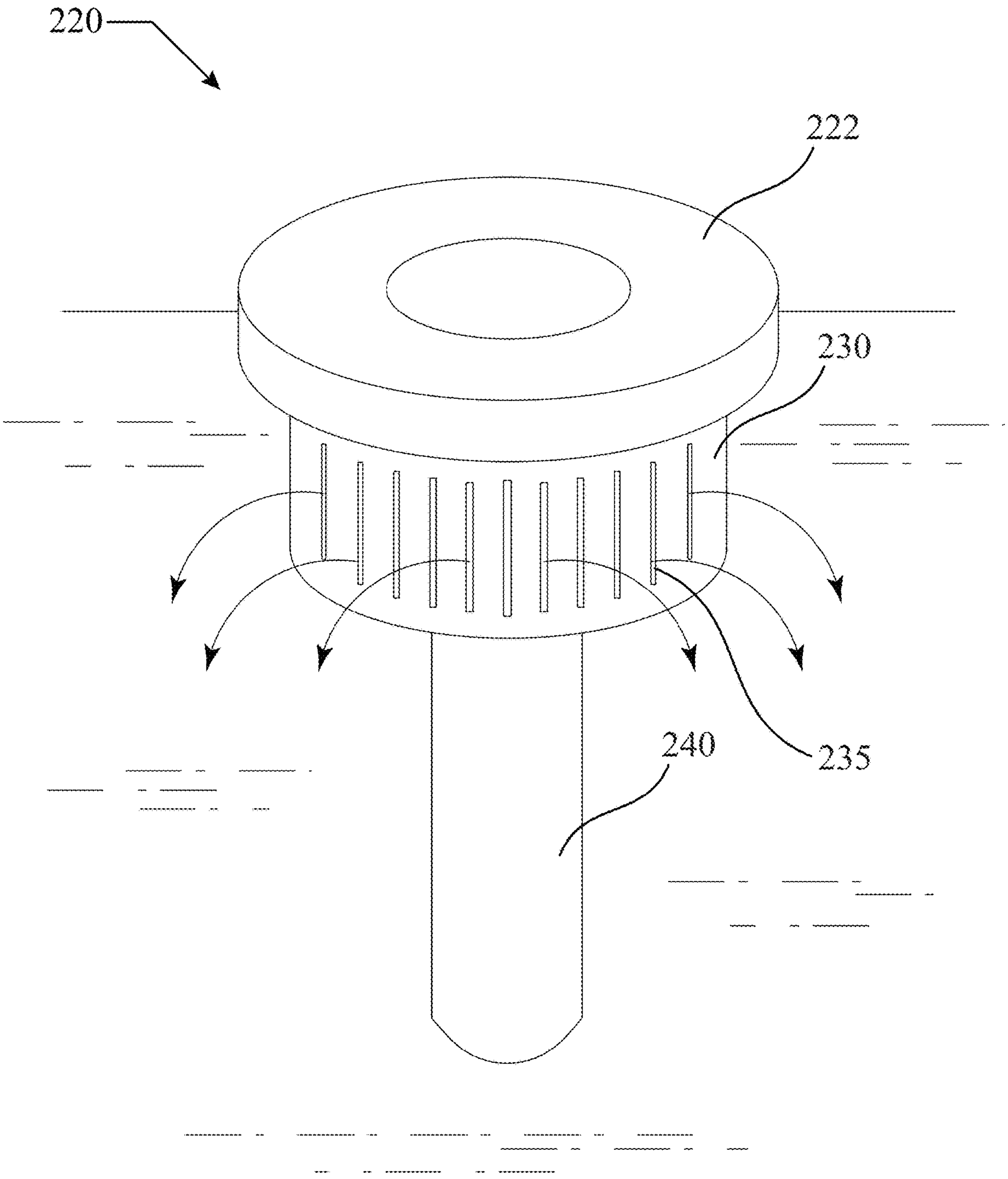
FIG. 8B is a perspective view of another inground dispenser of a cylinder on a post with slits on the cylinder releasing a solution of 2-PE dissolved in water solution into surrounding soil.

FIG. 8B is a perspective view of another inground dispenser 220 of a disc top 22 on a cylinder 230 with side vertical slits 235 on a post 240, where the slits are can be used for releasing a solution of 2-PE dissolved in water solution into surrounding soil.

The inground dispenser 220 with slide slits 235 can be placed adjacent to termite monitoring or bait stations with toxicants that were previously described, so the released solution attracts termites to the termite monitoring or bait stations having toxicants. The placement can be between approximately 4 inches to approximately 6 feet. The treated soil would lead the termites to the monitoring or bait stations with toxicants.

Figure 8C:
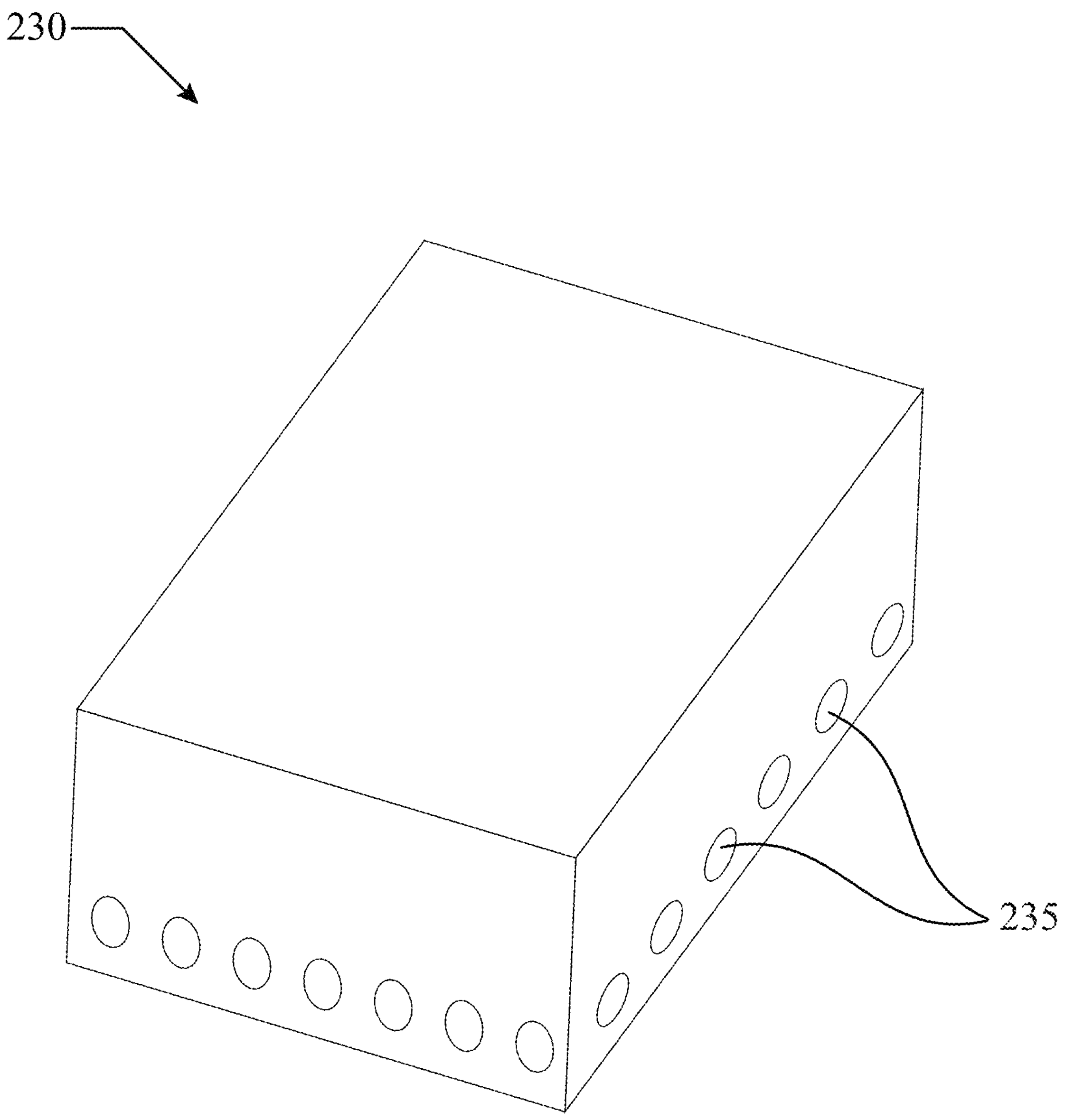
FIG. 8C is a perspective view of an above ground dispenser of a box with side openings for releasing a solution of 2-PE dissolved in water solution into surrounding soil.

FIG. 8C is a perspective view of an above ground dispenser 230 of a box configuration having slide openings for releasing a solution of 2-PE dissolved in water solution onto wood infested with termites. The infested wood can include, but is not limited to cut firewood, The above ground dispenser can be attached laterally to the side of termite infested wood, such as a fence of side of wood building by being fastened thereon with screws, nails, and the like.

The dispensing trail could either leach into the infested wood or treat the surface of the wood to form a trail.

An adjacent termite monitoring or bait station with toxicants can be attached within approximately 4 inches to approximately 6 feet. The adjacent termite monitoring or bait station with toxicants can be either or both above ground or below ground.

The above ground termite above ground dispenser 230 can be similar to those shown and described in U.S. Pat. Nos. 6,233,865 6,370,814 to Curtis et al., and as shown and described in U.S. Published Patent Application 2017/0105403, which are each incorporated by reference in their entirety. These prior art devices can be modified into dispensers.

Figure 9A:
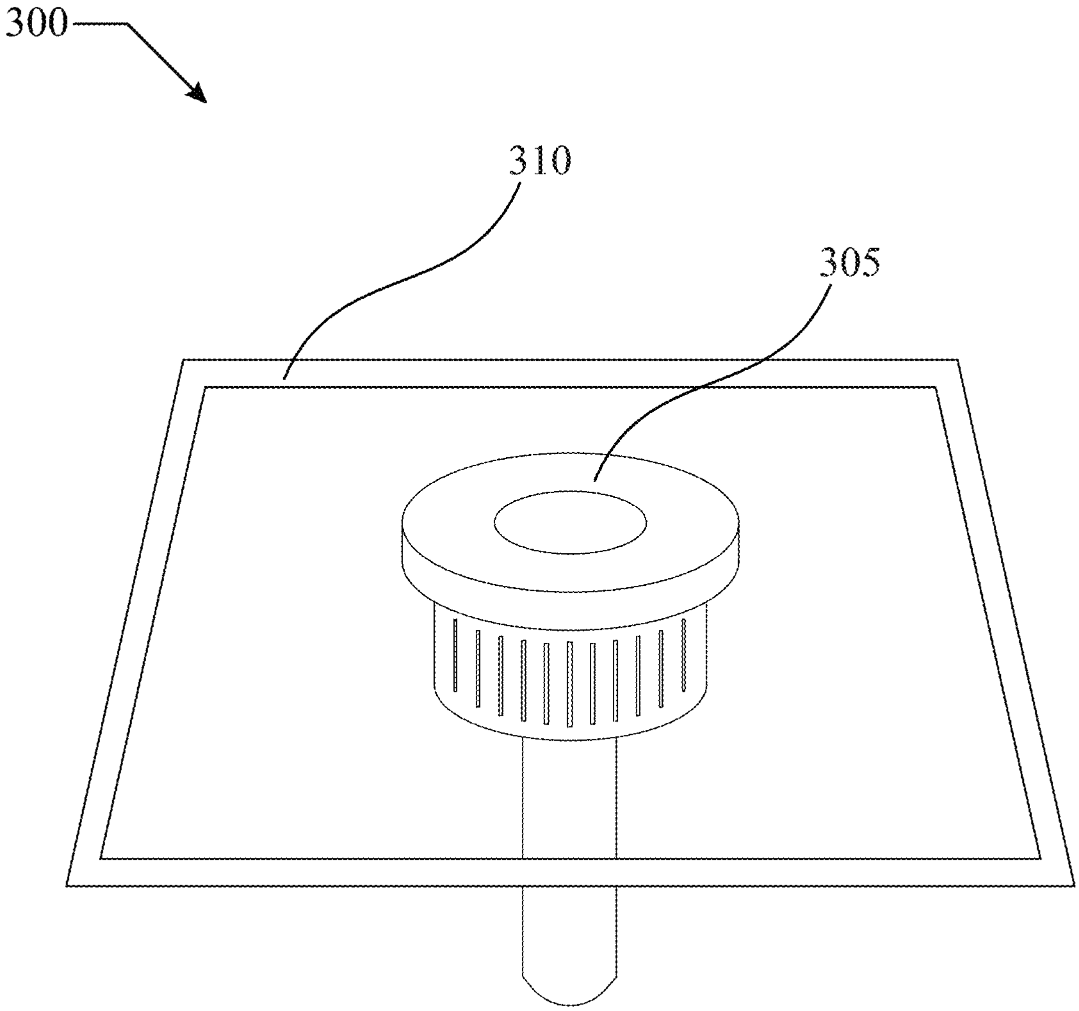
FIG. 9A is a perspective view of a termite monitoring or bait station box with toxicant, along with a rectangular trail of 2-PE dissolved in water to further attract termites to the termite monitoring or bait station with toxicant.

FIG. 9A is a perspective view 300 of a termite monitoring or bait station with toxicant 305, along with a rectangular trail 310 of 2-PE dissolved in water to further attract termites to the termite monitoring or bait station with toxicant. The trail 310 can be located between approximately four inches up to approximately 6 feet from the termite monitoring or bait station with toxicant 305 so as to attract termites to the termite monitoring or bait station with toxicant 305.

Figure 9B:
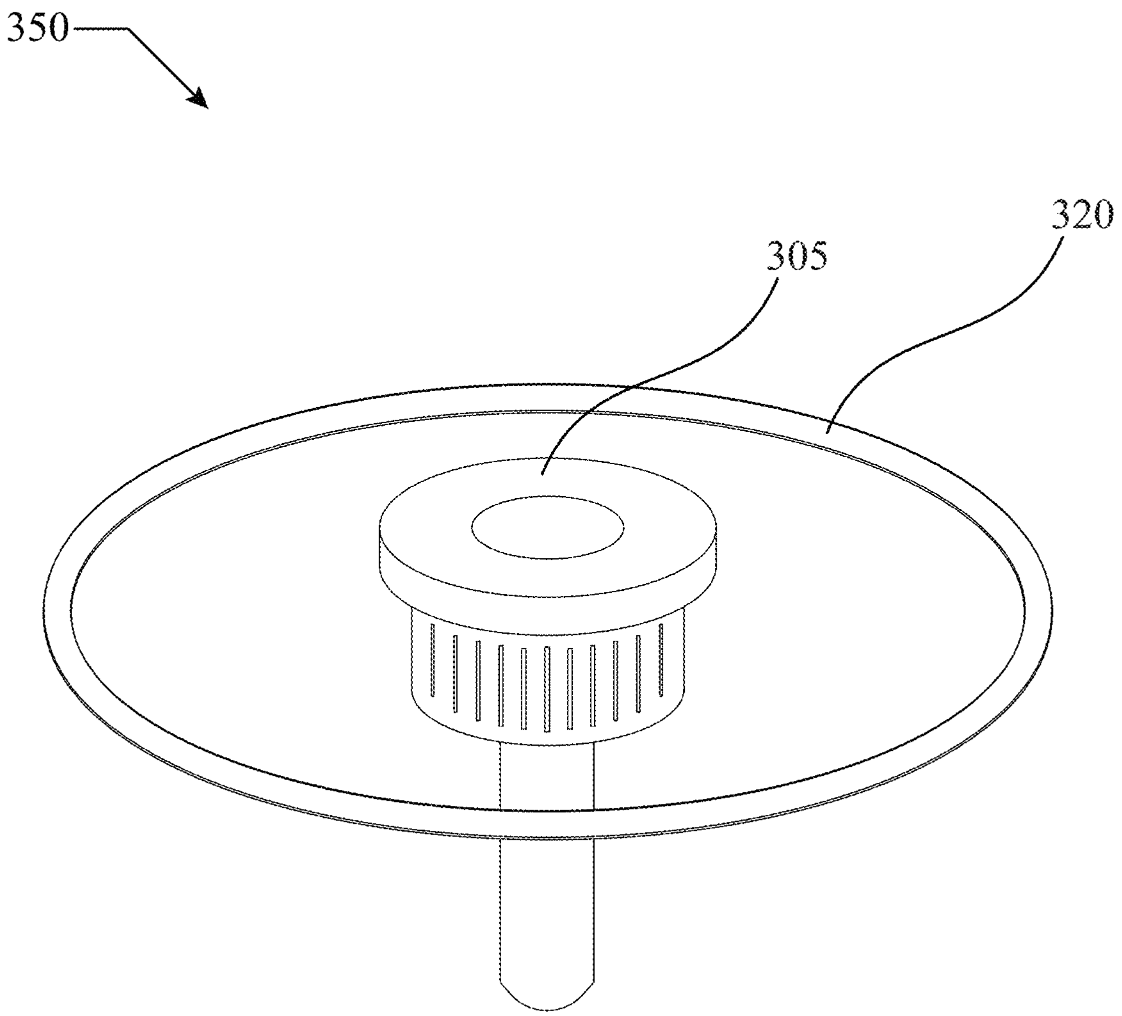
FIG. 9B is a perspective view of a termite monitoring or bait station box with toxicant, along with a circular ring trail of 2-PE dissolved in water to further attract termites to the termite monitoring or bait station with toxicant.

FIG. 9B is a perspective view 350 of a termite monitoring or bait station with toxicant 305, along with a circular ring trail 320 of 2-PE dissolved in water to further attract termites to the termite monitoring or bait station with toxicant. The trail 320 can be located between approximately four inches up to approximately 6 feet from the termite monitoring or bait station with toxicant 305 so as to attract termites to the termite monitoring or bait station with toxicant 305.

While the termite monitoring or bait station 305 with toxicant 205 is shown in one type of configuration, other types of termite monitoring or bait with toxicants can be used, such as those previously described.

While the continuous trail in FIGS. 9A-9B, is shown as rectangular and circular, other geometric configurations, can be used, such as but not limited to triangular, oval, and the like.

Figure 10:
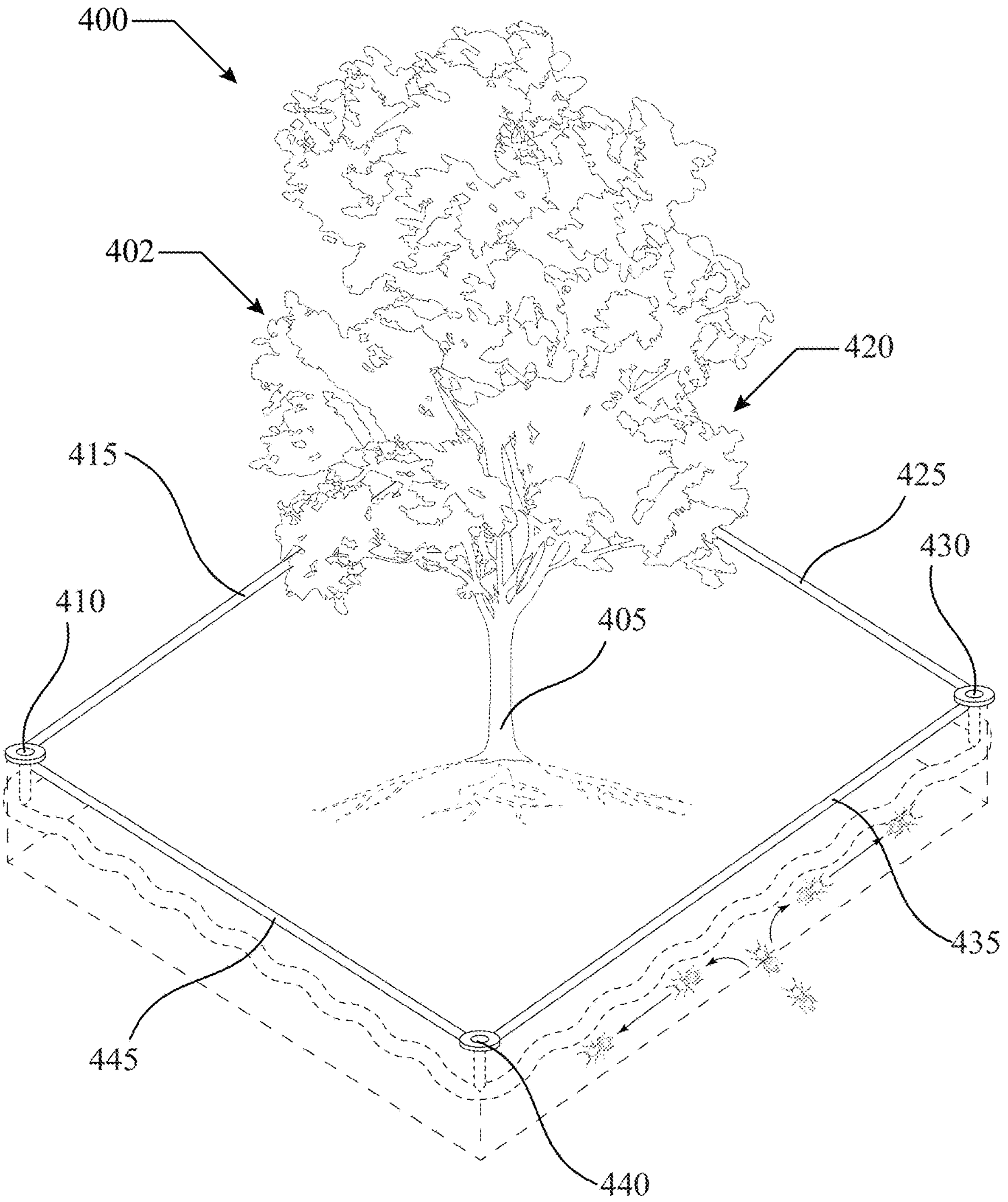
FIG. 10 is a perspective view of a tree surrounded by spaced apart termite monitoring or bait stations with 2PE dissolved in water trails connecting each of the termite monitoring or bait stations.

FIG. 10 is a perspective view 400 of a tree 405 surrounded by spaced apart termite monitoring or bait stations 410, 420 (not shown, but behind tree 405), 430, 440 with 2PE dissolved in water trails 415, 425, 435, 445 connecting each of the termite monitoring or bait stations 410, 420, 430, 440.

Similar to the previous embodiments the 2PE dissolved in water trails 415, 425, 435, 445 will direct termites approaching or adjacent the tree 405 to the adjacent termite monitoring or bait stations 410, 420, 430, 440. The termite monitoring or bait stations with toxicants 410, 420, 430, 440 can be spaced at least approximately 18 inches up to approximately 10 feet outside the trunk of the tree 405.

Additionally, a plurality of termite monitoring or bait stations with toxicants 410, 420, 430, 440 can be placed in a perimeter surrounding a plurality of trees.

Figure 11:
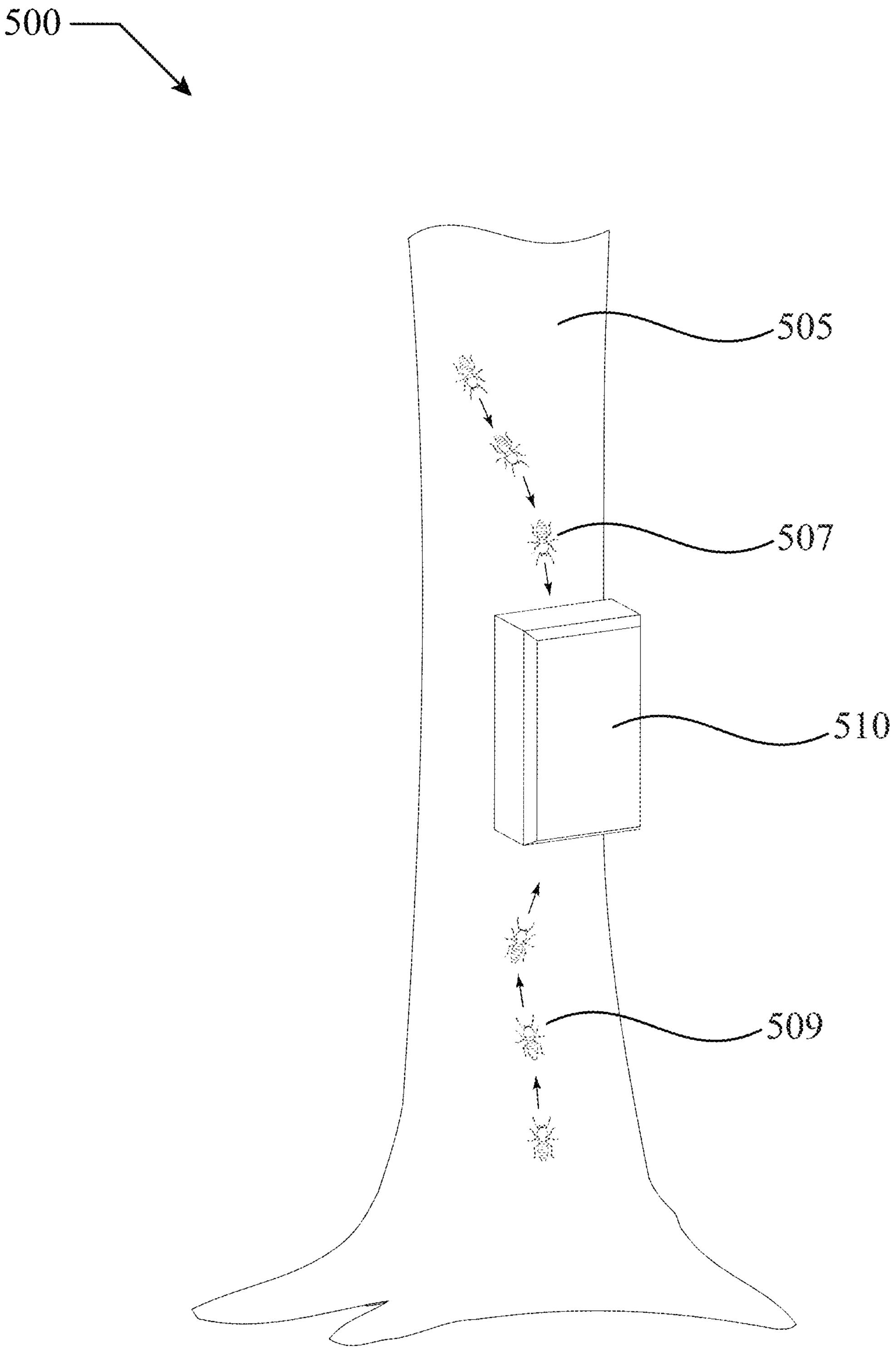
FIG. 11 is a perspective view of a single tree with termites adjacent the termite monitoring or bait station box mounted on the tree, and similar to FIG. 7C a syringe injecting the 2-PE dissolved in water solution can be injected into a termite gallery to recruit termites to the termite monitoring or bait station box mounted on the tree.

FIG. 11 is a perspective view 500 of a single tree 505 with termites adjacent the termite monitoring or bait station box with toxicant 510 mounted on the tree 505. Similar to FIG. 7C a syringe can be used for injecting a solution of 2-PE dissolved in water into a termite gallery 507, 509 to recruit termites to the termite monitoring or bait station box 510 mounted on the tree. 505.

Alternatively, the 2-PE in water solution can be surface sprayed along the sides of the tree from a knot hole, and/or from a broken branch to the termite monitoring or bait station box 510 with toxicant.

As previously described, above ground termite monitoring or bait stations with toxicants, can include but are not limited to U.S. Pat. Nos. 6,233,865 and 6,370,814 to Curtis et al., which are both incorporated by reference in their entirety, and U.S. Published Patent Application 2017/0105403 to Azzarello et al., which is incorporated by reference in its' entirety.

Figure 12:
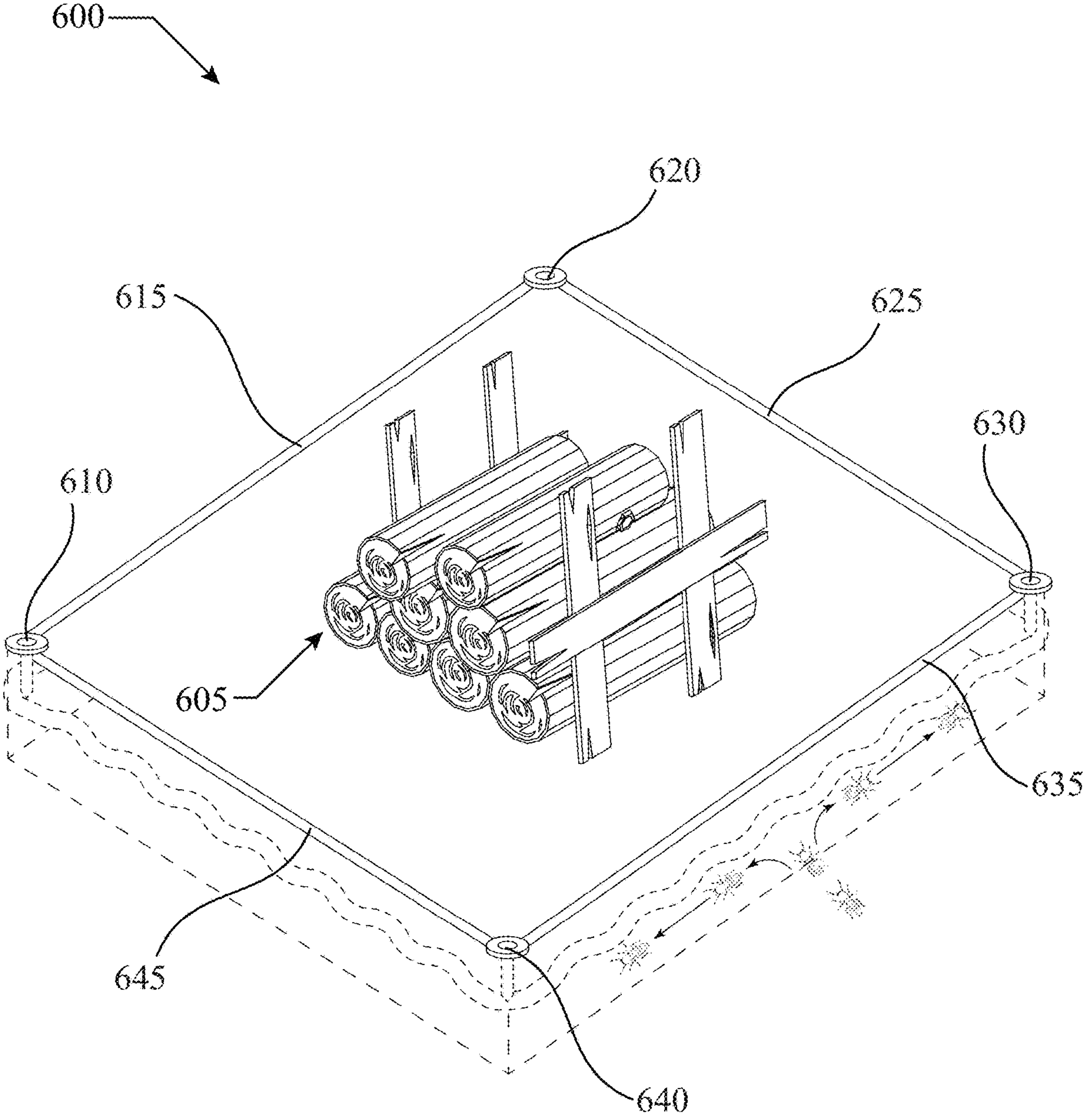
FIG. 12 is a perspective view of a cut stacked wood pile surrounded by spaced apart termite monitoring or bait stations with 2PE dissolved in water trails connecting each of the termite monitoring or bait stations.

FIG. 12 is a perspective view 600 of a cut stacked wood pile 605 surrounded by spaced apart termite monitoring or bait stations with toxicants 610, 620, 630, 640 with 2PE dissolved in water trails 615, 625, 635, 645, connecting each of the termite monitoring or bait stations 610, 620, 630, 640. The cut stacked wood pile 605 can be exterior stored firewood that is susceptible to termite damage.

Similar to the previous embodiments the 2PE dissolved in water trails 615, 625, 635, 645 will direct termites approaching or adjacent the cut stacked wood pile 605 to the adjacent termite monitoring or bait stations 615, 625, 635, and 645.

The termite monitoring or bait stations with toxicants 615, 625, 635, 645 can be spaced at least approximately 18 inches or more outside the cut stacked wood pile 605.

Figure 13:
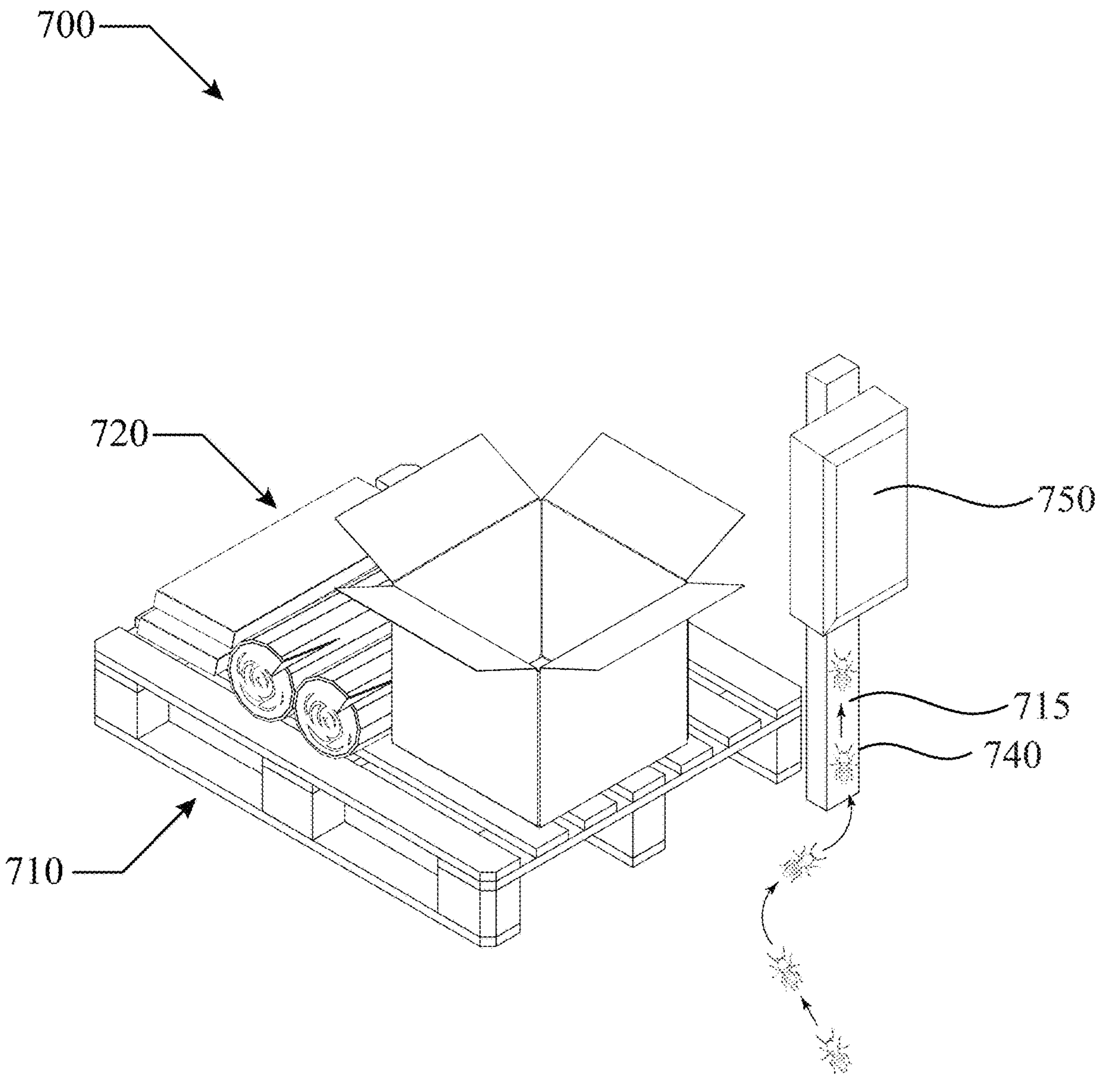
FIG. 13 is a perspective view of a wood pallet with wood and/or boxes, adjacent to a post with a mounted termite monitoring or bait station box with toxicant thereon, where a trail of 2PE dissolved in water trail be located on the post to direct termites to the post mounted termite monitoring or bait station box.

FIG. 13 is a perspective view 700 of a wood pallet 710 with wood and/or boxes, 720 adjacent to a post 740 with a mounted termite monitoring or bait station box with toxicant 750 thereon, where a trail of 2PE dissolved in water solution I 715 be placed on the post to direct termites to the post mounted termite monitoring or bait station box 750. The solution can be injected into the post 740 as previously described. Alternatively, the solution can be sprayed on the outer surface of the post to direct termites to the mounted termite monitoring or bait station box with toxicant 750.

Similar to previous embodiments, the trail of 2PE dissolved in water trail 715 will direct and lead termites to the post mounted termite monitoring or bait station box 750.

As previously described, above ground termite monitoring or bait stations with toxicants, can include but are not limited to U.S. Pat. Nos. 6,233,865 and 6,370,814 to Curtis et al., which are both incorporated by reference in their entirety, and U.S. Published Patent Application 2017/0105403 to Azzarello et al., which is incorporated by reference in its' entirety.

Figure 14:
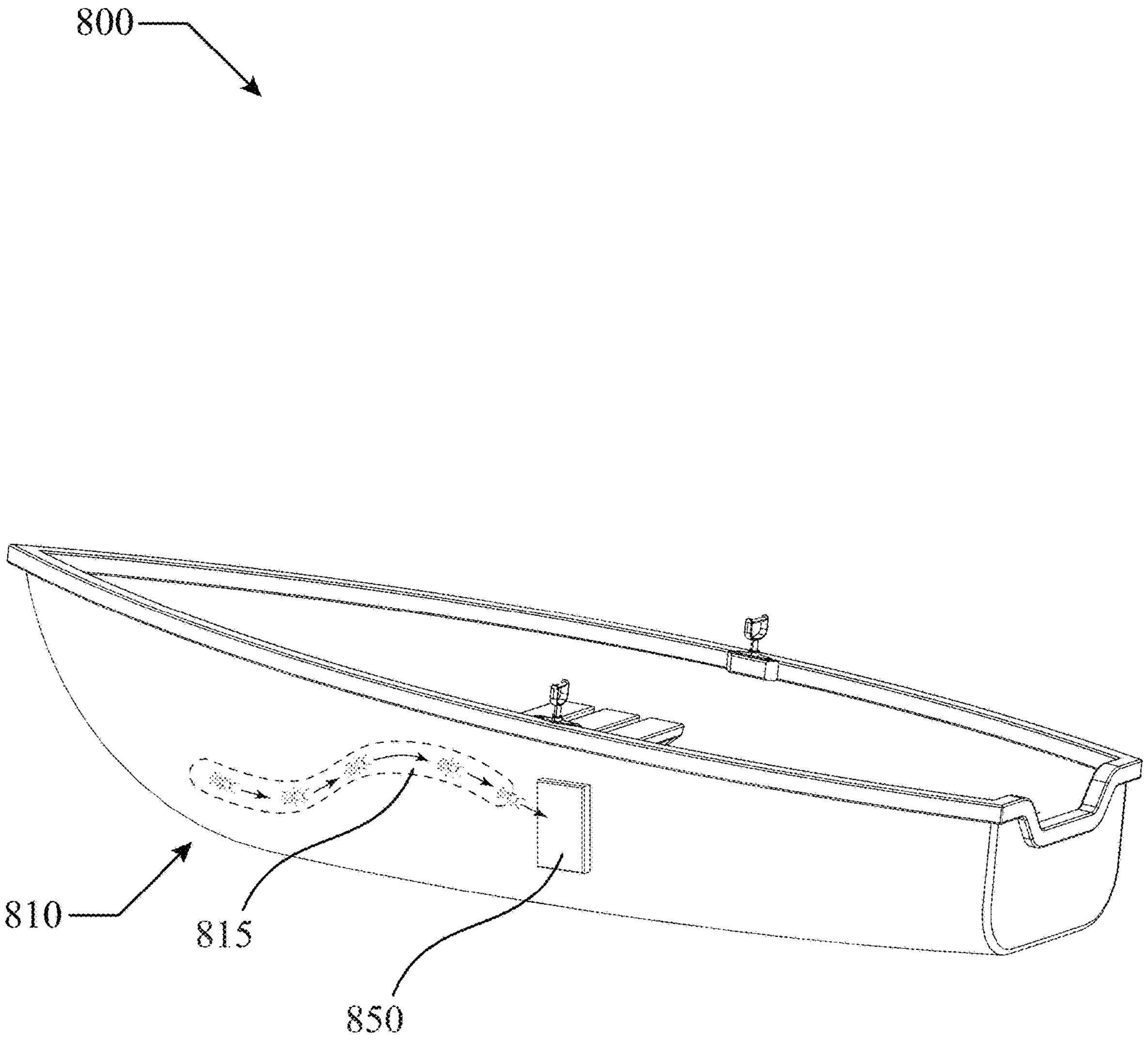
FIG. 14 is a perspective view of a wood boat with a termite monitoring or bait station box mounted to the boat, where a trail of 2PE dissolved in water trail can be located on the boat to direct termites to the mounted termite monitoring or bait station box.

FIG. 14 is a perspective view 800 of a wood boat 810 with a termite monitoring or bait station box 850 mounted to the boat 810, where a trail of 2PE dissolved in water solution 815, can be located on the boat 815 to direct termites to the mounted termite monitoring or bait station box 850.

As previously described above ground termite monitoring or bait stations with toxicants, can include but are not limited to U.S. Pat. Nos. 6,233,865 and 6,370,814 to Curtis et al., which are both incorporated by reference in their entirety, and U.S. Published Patent Application 2017/0105403 to Azzarello et al., which is incorporated by reference in its' entirety.

The solution can be injected into the sides of the boat to form a trail 815 as previously described. Alternatively, the solution can be sprayed on the outer surface of the boat 810 to form a trail to direct termites to the mounted termite monitoring or bait station box with toxicant 850.

While the boat 810 appears to be a rowboat, any type of wood boat in different sizes can be used with this invention.

Additionally, a large boat can be surrounded by inground termite monitoring or termite bait stations, with trails of 2-PE dissolved in water trails spaced away from the boat, in a manner such as those previously described, The Benefits for the use of 2-PE and KCl and/or K2CO3 in soil include:

A. Enhanced termite detection capability with the use of monitoring devices with a reduction in time to detection due to directed termite training behavior.

B. Reduction of pesticide use when used in conjunction with termite bait systems that contain toxicants within matrixes and tamper-resistant stations.

C. Reduction of risk for termite damage to wood-containing structures by directing termites away from structures and into termite bait and/or monitoring stations.

The slash symbol "/" used in the description can be interpreted to mean "and", or "or" between each of the terms before and after the slash symbol. The terms "approximately" or "approximate or approx." can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A method for trailing and recruiting termites to termite stations containing termite toxicants, comprising the steps of:

providing a plurality of termite stations, the termite stations selected from the group consisting of termite bait stations and termite monitoring stations, each of the termite stations contain termite toxicants;

locating the termite stations located up to approximately 10 to approximately 20 feet apart from each other, and surrounding a wood member, the wood member selected from the group consisting of a wood based house structure, a wood tree, a plurality of wood trees, a wood fence, a wood post, stacked cut wood, a wood pallet and a wood boat; and providing a solution of approximately 0.1% to approximately 2% of 2 phenoxyethanol (2-PE), dissolved in water;

applying a continuous trail of the solution to soil between the termite stations connecting each of the termite stations; and forming a closed loop perimeter spaced at least approximately 18 inches outside the wood member with the continuous trail and spaced apart termite stations, wherein the continuous trail prevents termites from tunnelling between the stations so the termites will be redirected away from the wood member and to an adjacent one of the termite stations with the termite toxicants.

2. A method for trailing and recruiting termites to a termite station containing termite toxicants, comprising the steps of:

providing a termite station that contains a termite toxicant, the termite station selected from the group consisting of a termite bait station and a termite monitoring station;

providing a wood structure on which the termite station is mounted, the wood structure is selected from the group consisting of a wood based house structure, a wood tree, wood fence, a wood post, a wood boat, a wood pallet and stacked wood, the wood structure having a termite gallery with termites, with the termite station mounted to the wood structure adjacent to the termite gallery; and providing a solution of approximately 0.1% to approximately 2% of 2 phenoxyethanol (2-PE), dissolved in water; and applying the solution to the termite gallery, so the termites are directed to the termite station with the termite toxicant.

3. The method of claim 2, wherein the wood structure is a wood-based house structure.

4. The method of claim 2, wherein the wood structure is a wood tree.

5. The method of claim 2, wherein the wood structure is a wood fence or wood post.

6. The method of claim 2, wherein the wood structure is a wood boat.

7. The method of claim 2, wherein the step of applying the solution to the termite gallery is formed by a spray.

8. The method of claim 2, wherein the solution is applied by a syringe.

9. A method for trailing and recruiting termites to a termite station containing termite toxicants, comprising the steps of:

providing an inground dispenser having a solution of approximately 0.1% to approximately 2% of 2 phenoxyethanol (2-PE), dissolved in water, which releases the solution to a soil surface to attract termites; and locating a termite station adjacent to the dispenser, adjacent to wood having termites, the wood selected from the group consisting of a wood based house structure, a wood tree, a plurality of wood trees, a wood fence, a wood post, stacked cut wood, a wood pallet and a wood boat, the termite station selected from the group consisting of a termite bait station and a termite monitoring station, the termite station contains a termite toxicant, and locating the termite station spaced between approximately 4 inches to approximately 6 feet from the in ground dispenser, wherein the termites in the wood are directed to the termite station by the solution of 2-PE and are killed by the termite toxicant.

10. The method of claim 9, wherein the step of providing the inground dispenser includes:

providing a cylinder containing the solution having vertical slits, inserted inground to release the solution into surrounding soil.

11. The method of claim 9, wherein the step of providing the inground dispenser includes:

providing a cylinder containing the solution having slits over a support post, inserted inground, wherein the cylinder having the slits release the solution into surrounding soil.

12. A method for trailing and recruiting termites to a termite station containing termite toxicants, comprising the steps of:

providing an above ground dispenser comprising a box with side slits, containing a solution of approximately 0.1% to approximately 2% of 2 phenoxyethanol (2-PE), dissolved in water, which releases the solution to a surface to attract termites;

providing a termite station containing a termite toxicant, the termite station being selected from the group consisting of a termite bait station and a termite monitoring station;

locating the termite station adjacent to wood having termites, the wood selected from the group consisting of a wood based house structure, a wood tree, a wood fence, a wood post, stacked cut wood, a wood pallet and a wood boat, the termite station selected from the group consisting of a termite bait station and a termite monitoring station; and locating the termite station between approximately 4 inches to approximately 6 feet to the above ground dispenser, wherein termites from the wood having termites are killed by the termite toxicant in the termite station.

13. The method of claim 12, wherein the above ground dispenser is positioned on top of the wood which release the solution on the wood.

14. The method of claim 12, wherein the above ground dispenser is mounted laterally on the wood which release the solution on the wood.

15. A method for trailing and recruiting termites to a termite station containing termite toxicants, comprising the steps of, comprising the steps of:

locating an in ground termite station adjacent to wood having termites, the termite station selected from the group consisting of a termite bait station and a termite monitoring station, the wood selected from the group consisting of a wood based house structure, at least one wood tree, a wood fence, a wood post, stacked cut wood, a wood pallet and a wood boat;

applying a solution trail of approximately 0.1% to approximately 2% of 2 phenoxyethanol (2-PE), dissolved in water, applied to a soil surface to form a continuous trail in a configuration forming a closed loop configuration located between approximately 4 inches to approximately 6 feet from the termite station, the configuration selected from the group consisting of a rectangular configuration trail, a circular configuration trail and a geometric configuration trail, wherein termites from the wood are directed to the termite station.

16. The method of claim 15, wherein the configuration of the continuous trail is a rectangular trail about the termite station with the toxicant.

17. The method of claim 15, wherein the configuration of the continuous trail is a circular ring trail about the termite station with the toxicant.

18. The method of claim 15, wherein the continuous trail is formed in a geometric configuration trail about the termite bait/monitoring station with the toxicant.

19. A method for trailing and recruiting termites to termite stations containing termite toxicants, comprising the steps of:

providing a plurality of termite stations, the termite stations selected from the group consisting of termite bait stations and termite monitoring stations, each termite station includes a termite toxicant;

locating the termite stations between approximately 10 to approximately 20 feet apart from each other, and surrounding a wood structure, the wood structure selected from the group consisting of a wood house, at least one wood tree, a wood fence, a wood post, stacked cut wood, at least one wood pallet, and at least one wood boat, each of the termite stations spaced at least approximately 18 inches up to approximately 10 feet outside the wood structure; and providing a solution of approximately 0.1% to approximately 2% of 2 phenoxyethanol (2-PE), dissolved in water;

applying the solution to a soil surface to form a continuous trail connecting each of the termite stations; and forming, a closed loop perimeter around the wood structure with the continuous trail, wherein the continuous trail prevents termites from tunneling between the stations, and directs the termites away from the wood structure and into one of the termite stations.

20. The method of claim 2, wherein the wood structure is a wood pallet.

21. The method of claim 2, wherein the wood structure is stacked wood.

* * * * *